(12) United States Patent
Schmidt et al.

(10) Patent No.: US 9,284,001 B2
(45) Date of Patent: Mar. 15, 2016

(54) BUOYANT TRACK AMPHIBIOUS TRANSPORTER AND TRACTION CELLS THEREFOR

(75) Inventors: Terrence W. Schmidt, Santa Clara, CA (US); Jeffrey E. Kline, Severna Park, MD (US); Gary Shimozono, Kapolei, HI (US)

(73) Assignee: NAVATEK, LTD., Honolulu, HI (US)

( * ) Notice: Subject to any disclaimer, the term of this patent is extended or adjusted under 35 U.S.C. 154(b) by 523 days.

(21) Appl. No.: 13/407,025

(22) Filed: Feb. 28, 2012

(65) Prior Publication Data

US 2012/0225596 A1 Sep. 6, 2012

Related U.S. Application Data

(63) Continuation-in-part of application No. 13/041,015, filed on Mar. 4, 2011, now abandoned.

(51) Int. Cl.
*B60F 3/00* (2006.01)
*B62D 55/20* (2006.01)
*B63H 19/08* (2006.01)
*B63H 1/34* (2006.01)

(52) U.S. Cl.
CPC ............ *B62D 55/202* (2013.01); *B60F 3/0015* (2013.01); *B63H 19/08* (2013.01); *B63H 2001/344* (2013.01)

(58) Field of Classification Search
CPC .......................... B60F 3/0015; B62D 55/247
USPC ........... 305/166, 34; 416/7; 440/12.63, 12.64, 440/12.5, 12.56
See application file for complete search history.

(56) References Cited

U.S. PATENT DOCUMENTS

| 1,913,605 | A | | 6/1933 | Martin |
|---|---|---|---|---|
| 1,928,511 | A | | 9/1933 | St. Martin |
| 2,748,827 | A | * | 6/1956 | Kerr et al. ................... 152/341.1 |
| 3,170,533 | A | | 2/1965 | Fewel et al. |
| 3,244,458 | A | | 4/1966 | Frost |
| 3,313,263 | A | | 4/1967 | Ferguson |
| 3,427,078 | A | | 2/1969 | Parsons |
| 3,902,765 | A | * | 9/1975 | Kowachek et al. ............. 305/34 |
| 3,987,748 | A | | 10/1976 | Carroll |
| 4,433,634 | A | | 2/1984 | Coast |
| 4,530,545 | A | | 7/1985 | Bertelsen |
| 4,645,023 | A | | 2/1987 | Rea et al. |
| 4,715,668 | A | | 12/1987 | Burmeister |
| 4,934,300 | A | | 6/1990 | Seligman et al. |
| 4,961,395 | A | | 10/1990 | Coast |
| 5,027,737 | A | | 7/1991 | Duffy et al. |
| 5,899,164 | A | | 5/1999 | Coast |
| 6,482,053 | B1 | | 11/2002 | Prestenbach |
| 6,582,258 | B2 | | 6/2003 | Morin |

(Continued)

FOREIGN PATENT DOCUMENTS

GB 2351707 9/2001

*Primary Examiner* — S. Joseph Morano
*Assistant Examiner* — Andrew Polay
(74) *Attorney, Agent, or Firm* — Fitzpatrick, Cella, Harper & Scinto

(57) ABSTRACT

A traction cell for use in a track drive of an amphibious or all-terrain vehicle includes a rigid section for connection to a track drive and at least one semi-rigid compliant section which is connected to the rigid section. The semi-rigid compliant section has a bottom surface to which a penetration resistant sole is secured on a rear face which is raked relative to the vertical.

37 Claims, 18 Drawing Sheets

(56) References Cited

U.S. PATENT DOCUMENTS

| | | |
|---|---|---|
| 6,918,801 B2 | 7/2005 | Wilson, Jr. et al. |
| 6,922,922 B2 | 8/2005 | Cheramie |
| 7,063,580 B1 * | 6/2006 | Birdwell ............... 440/12.56 |
| 2002/0155765 A1 | 10/2002 | Morin |
| 2004/0239182 A1 | 12/2004 | Lee |
| 2004/0248480 A1 | 12/2004 | Wilson, Jr. et al. |
| 2004/0255494 A1 | 12/2004 | Cheramie |
| 2005/0014425 A1 | 1/2005 | Wilson |

* cited by examiner

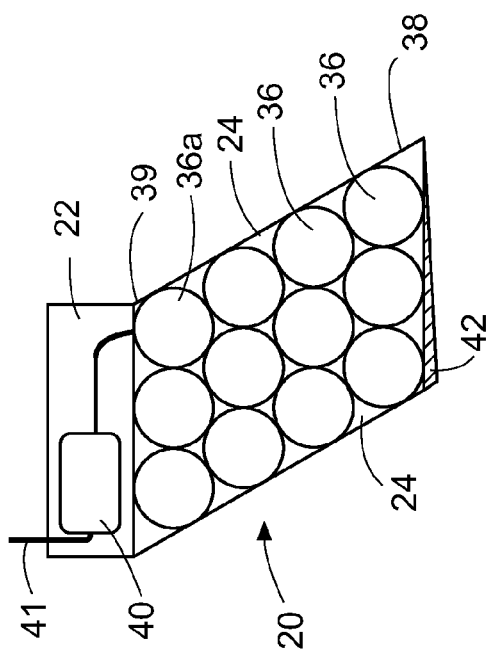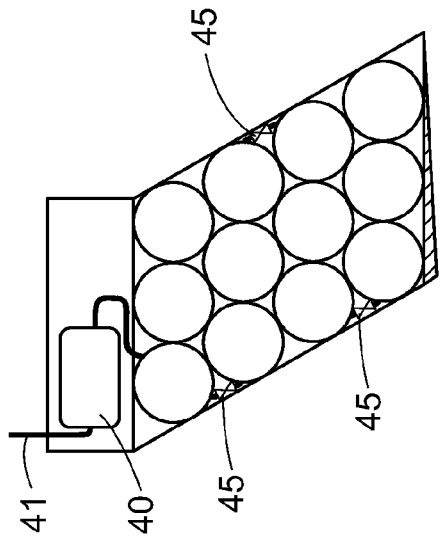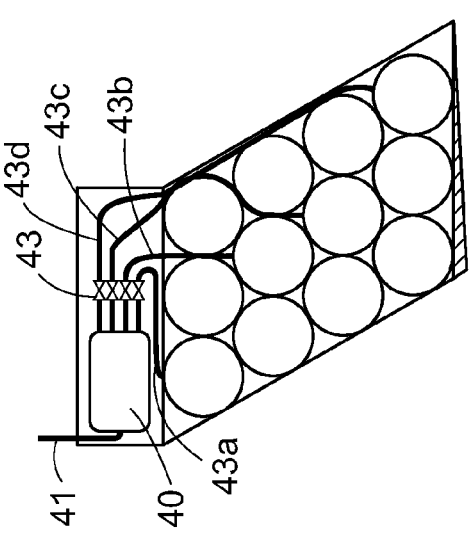

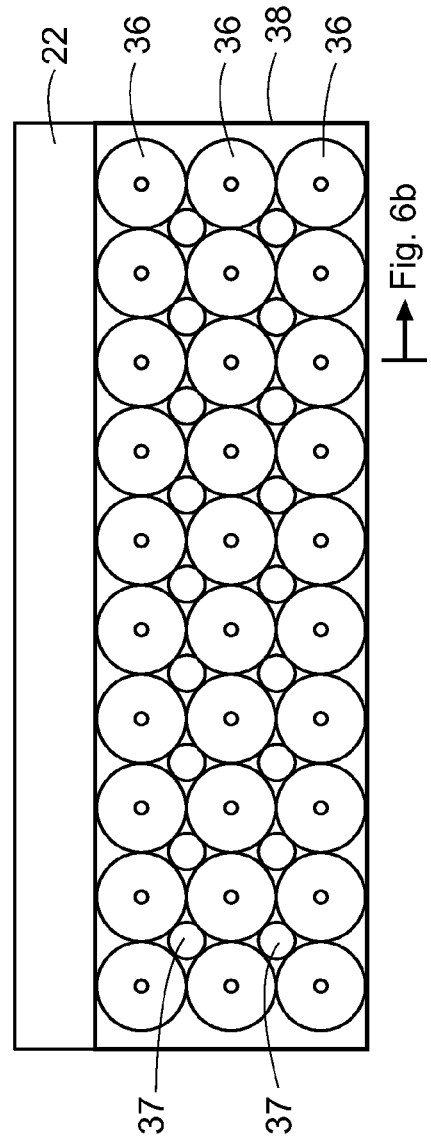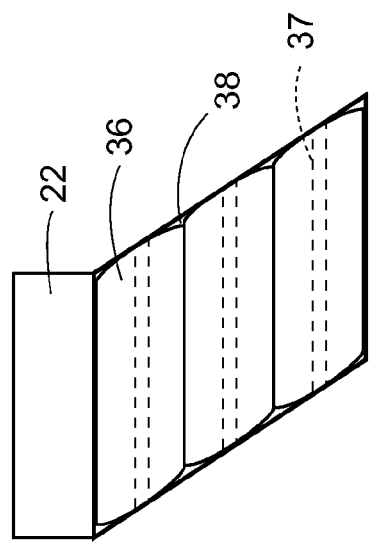

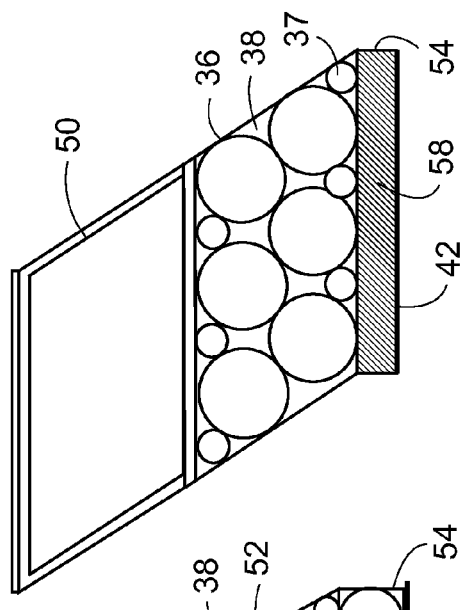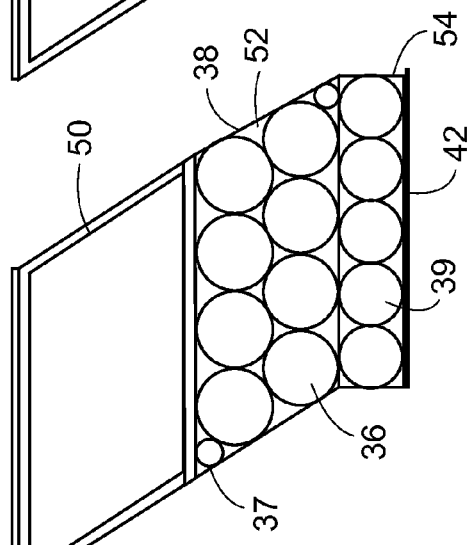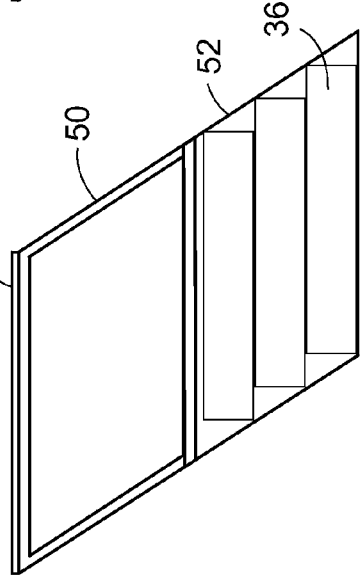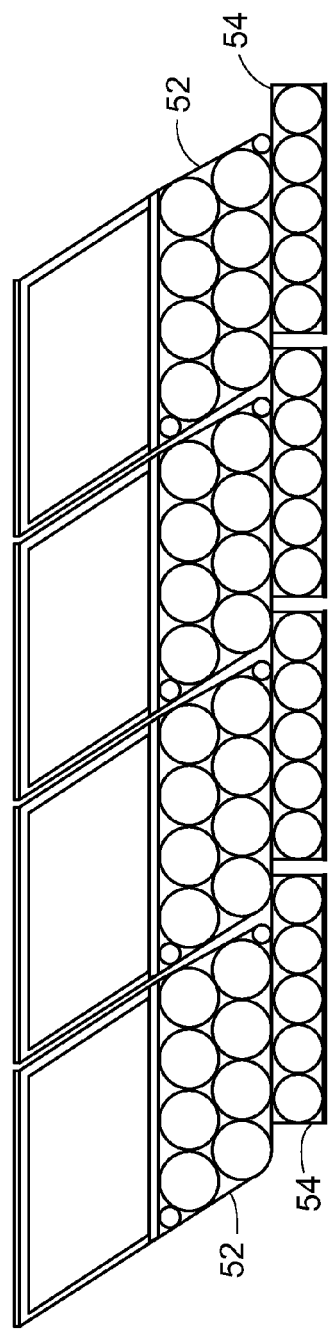

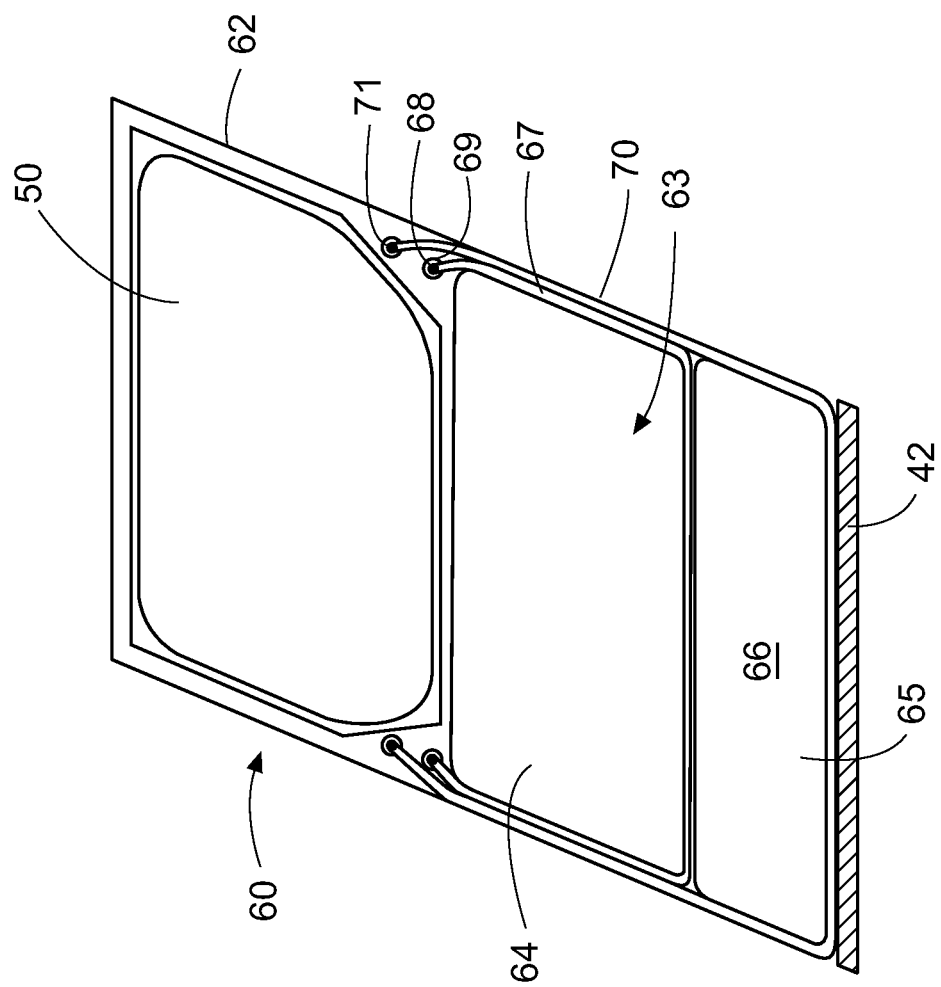

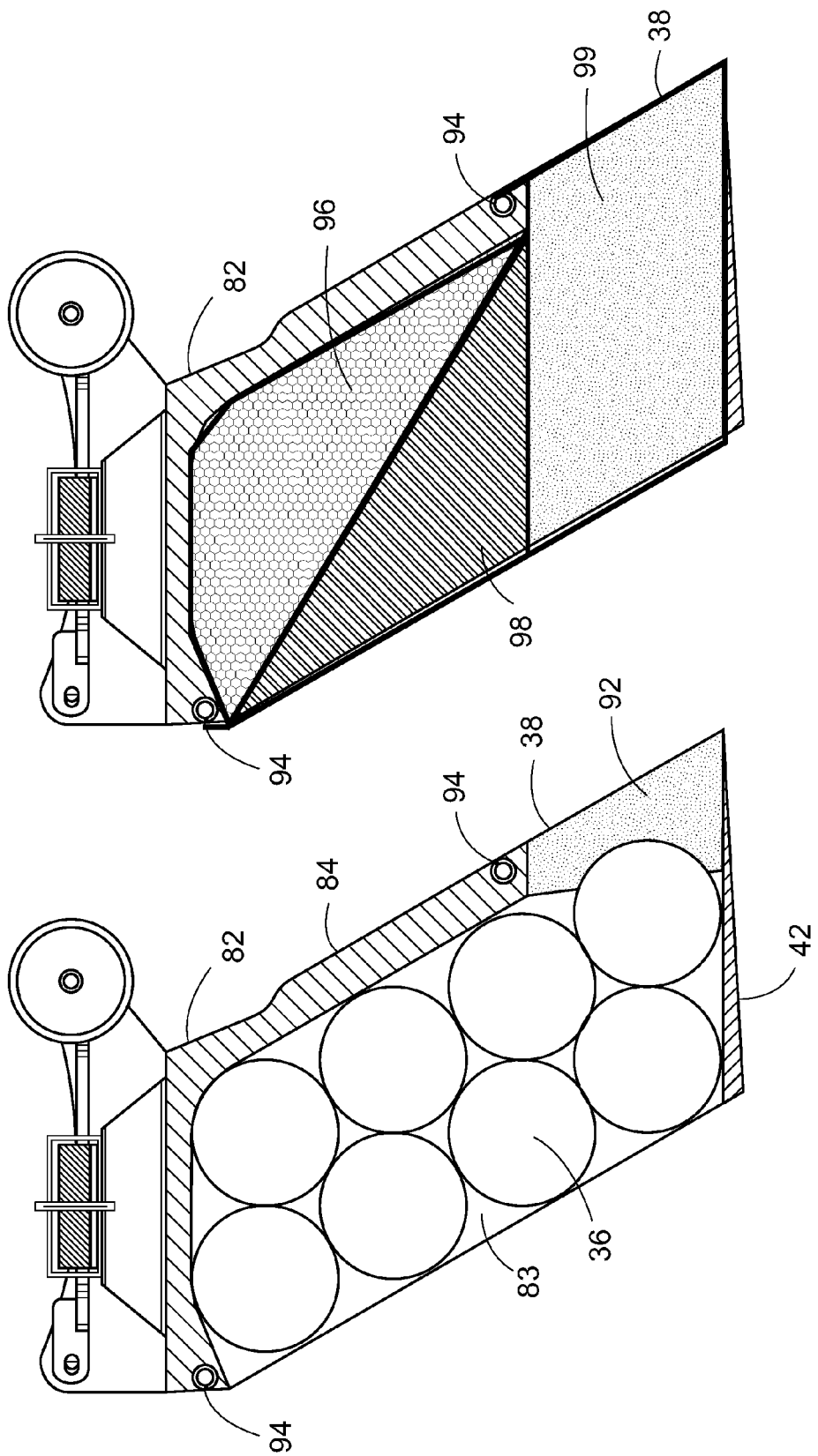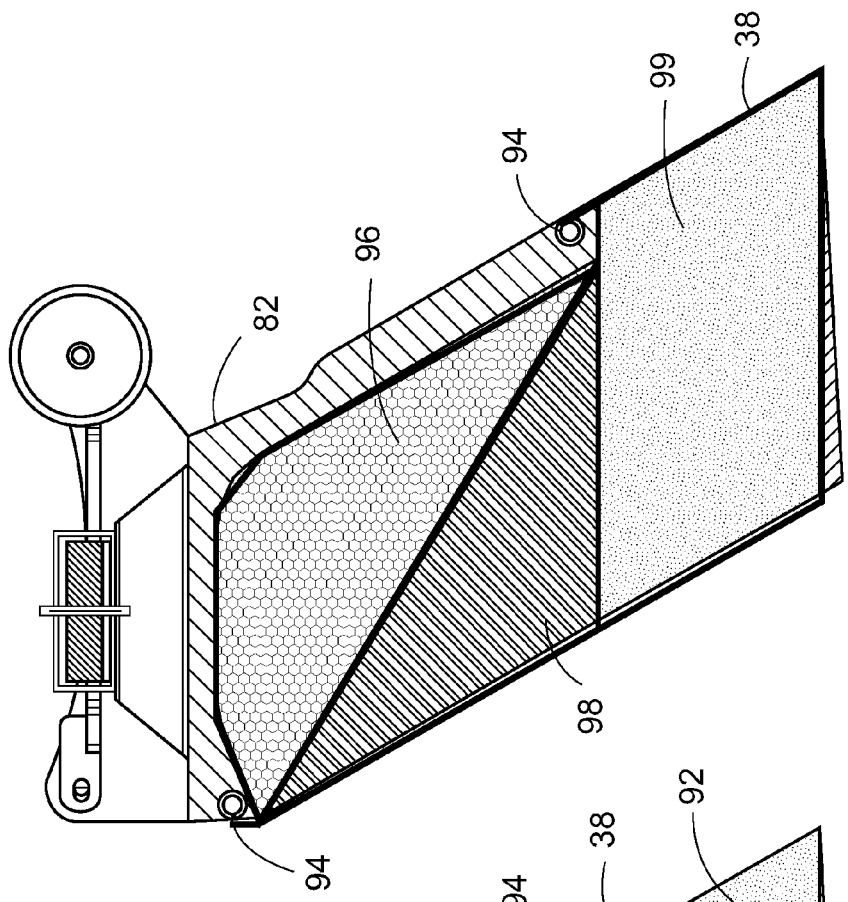

BUOYANT TRACK AMPHIBIOUS TRANSPORTER AND TRACTION CELLS THEREFOR

This application is a continuation-in-part of U.S. patent application Ser. No. 13/041,015 filed Mar. 4, 2011.

BACKGROUND OF THE INVENTION

Field of the Invention

The present invention relates to a buoyant track amphibious transporter and fraction cell structures for use on the track of an amphibious, tracked vehicle which is adapted for travel over varied terrain on land or water, and for transitioning between land and water.

Military and commercial operations in undeveloped regions often require the ability to transport equipment and personnel in an environment where soft soil, wetlands, water, and ice flows preclude the use of traditional vehicles. Often these operations require the transport of heavy equipment and personnel from ships offshore to locations ashore in areas where developed port facilities are either non-existent or are not available for use. In certain operations the delivery of war materiel requires clandestine transport from off-shore to an inland location at a non-improved coastal access point, as well as "off-road" inland mobility.

Air cushion vehicles and amphibious transporters currently known in the prior art are somewhat useful, but lack the ability to carry particularly heavy pieces of equipment across very soft soils, large obstacles and steep terrain. However, military air cushion vehicles do not carry heavy payloads relative to their light-ship weight. Additionally, they do not traverse steep inclines (>5 degrees) or large obstacles (>4 feet). Tracked and large low-pressure tire land transportation vehicles are used on solid soil, but are unable to operate in water, ice flows, or soils with low cohesive or shear strength properties. Currently available amphibious transporters also may be unable to traverse the soft soil beach interface between the ocean and the shore. In addition, previous embodiments of amphibious vehicles utilize a fixed structure or hull to provide the majority of the buoyancy and tracks or wheels with a relatively small ground footprint area. This results in high footprint pressures for the propulsion system.

Endless track vehicles designed for amphibious, all-terrain transportation are disclosed in Rea et al. U.S. Pat. No. 4,645,023; Frost U.S. Pat. No. 3,244,458; Fewel et al. U.S. Pat. No. 3,170,533; and Parsons U.S. Pat. No. 3,427,078. The latter three patents disclose the use of individual cells on endless track vehicles for all-terrain travel. Such individual cells allow for cushioning against impacts, enable travel over large obstacles, and redundancy in the isolation of the cells, limiting the effect of damage to a single cell.

Endless track vehicles with individual cells that also provide buoyancy in water travel have also been previously proposed as disclosed for example in Ferguson U.S. Pat. No. 3,313,263; Bertelsen U.S. Pat. No. 4,530,545; Burmeister U.S. Pat. No. 4,715,668; Morin U.S. Pat. No. 6,582,258; and Birdwell U.S. Pat. No. 7,063,580. Such vehicles however do not allow the tracks to extend substantially the full width of the vehicle. This results in lower payload weight capacity, deeper drafts when waterborne and high ground footprint pressures. One benefit of the buoyancy of such individual cells is that they allow the vehicle to float in water without having additional components for flotation such as an air cushion or other buoyant volume. Certain of the inflatable cells used in the prior art allow for pressure and volume regulation in the individual cells, for impact absorption and/or buoyancy.

In addition, although the prior art has established the ability to use individual cells on endless track vehicles for buoyancy and propulsion in both land and water, the cells used in these vehicles have not been optimized for efficient propulsion and load-carrying capabilities.

SUMMARY OF INVENTION

It is an object of the invention to provide a buoyant track amphibious transporter/vehicle and traction cell structure which will provide improved propulsion of the vehicle over both water and ground with minimal drag and energy dissipation when operating in water.

It also is an object of this invention to control the characteristics of a traction cell structure for a buoyant track amphibious transporter/vehicle which have the most effect on a tracked vehicle's cell load carrying and propulsive abilities, that is, its shape, stiffness, and material composition, as well as to provide examples of configurations that are optimal for different applications.

Another object of this invention is to provide a traction cell structure for an amphibious vehicle which has different pressures at different locations within an individual cell, for example by providing a cell composed of different materials of different resiliency for different locations within the individual cell.

A further object of the invention is to provide a traction cell for an amphibious vehicle with shape and compliance optimized for hydrodynamic thrust, buoyancy, load bearing on land, and puncture resistance due to small obstacles.

Yet another embodiment of the invention is to vary or regulate the pressure within individual components of the traction cell to provide varying pressure areas within the cell to improve load bearing characteristics and compliance with ground surface features.

A still further object of the invention is to provide a track path shape for an amphibious tracked vehicle with traction cells that optimizes hydrodynamic performance including, sinkage, trim and dynamic stability as well as all terrain performance including, low ground pressure, traction and maneuverability.

In accordance with one aspect of the present invention the composition of the materials from which traction cells used on amphibious tracked vehicles are made are selected to provide areas or sections of a varying pressure within each individual cell. The ability to vary the pressure within a cell, via use of multiple density and/or pressure regulated sections, allows control of stiffness (or compliance) throughout the cell. Constructing a cell with gradients in pressure provides a more effective means of varying the compliant, impact-absorbing portion of the cell for more efficient transmission of propulsive forces in both land and water to a stiffer, load-transmitting portion of the cell.

In accordance with another aspect of the invention, the propulsive efficiency of the traction cells is improved by controlling the cell shape. The thrust obtainable when traveling in water, the hydrodynamic drag on the cells, and the ability to handle difficult terrestrial travel are all affected by the cell shape.

In accordance with another aspect of the invention a buoyant track amphibious transporter is provided with a track profile that, in combination with the novel cell structure shape, increases the thrust produced by the track and minimizes energy dissipation and drag in water operations.

Traction cells for an amphibious, tracked vehicle made according to the present invention are able to provide all or partial weight bearing in both terrestrial (ground pressure) and waterborne (buoyancy) modes, as well as all or partial means of propulsion and steering in both terrestrial and waterborne modes. Such cells are able to travel over difficult terrain on land, water, and in transitioning between land and water. In particular, a tracked vehicle using such traction cells is able to carry heavy payloads across very soft soils, large obstacles, steep terrain, in water, ice flows, soils with low cohesive or shear strength properties, and the soft soil beach interface between the ocean and the shore.

As described in detail below the traction cells of the present invention are preferably anisotropic, i.e., their stiffness is different in different directions. The compliance or stiffness of the traction cell generally varies in the vertical direction from a compliant lower portion, which minimizes the transfer of obstacle point loads, to a rigid upper portion that attaches to the track. The cell's compliance in vertical and other directions (such as longitudinal) is also optimized for improved hydrodynamic thrust. Such cells preferably have a generally swept back shape relative to the lower, forward-most edge of the cell. The shape of the cell is optimized for hydrodynamic thrust, buoyancy, and load bearing on land. The shape of the aft or thrust face also is optimized for hydrodynamic thrust. The forward cell face is shaped to nest with the aft face of the adjacent cell to maximize buoyancy, thus reducing vehicle draft and drag in waterborne travel, and also to minimize ground pressure for load bearing on land. The cell's lower surface is generally flat and parallel to the vehicle baseline to provide the maximum footprint leading to the lowest ground pressure for a given weight and the highest prismatic coefficient for a given buoyancy. The cell's lower and side surfaces can also be angular, as described herein, to allow for increased hydrodynamic thrust when waterborne.

The shape and compliance of the traction cells of the present invention are controlled using a combination of rigid, semi rigid, and compliant sections. Through the removal or addition of combinations of rigid, semi rigid, and compliant sections, the shape and compliance can be made mission specific. The semi-rigid and compliant sections of the cells consist of isotropic elements. The semi rigid sections may be formed of flexible material such as inflated air beams or inflated drop stitch air cells whose rigidity can be increased or decreased by varying the air pressure therein. The compliant sections are formed of either lower pressure air beams or tubes or from an isotropic material that, when compressed, will withstand substantial deformation without damage and then return to its original shape. Traction cells formed in this way allow for definition of a specific shape and stiffness while reducing the overall weight of the cells. The inflatable chambers can be pressure regulated using a manifold system and single air input. Additionally, the use of buoyant inflatable chambers or air beams in the cells whose pressure can be regulated allows for changes in shape and compliability mid-mission. This adaptability of shape, compression ratio, stiffness, and compliability is a key to the invention.

The above and other objects, features and advantages of the present invention will be apparent to those skilled in the art from the following detailed description of illustrative embodiments thereof, which is to be read in connection with the accompanying drawings, wherein:

BRIEF DESCRIPTION OF THE DRAWINGS

FIG. 5a is a transverse cross-sectional schematic view of a traction cell according to one embodiment of the present invention;

FIG. 5b is a view similar to FIG. 5a showing one system for controlling the air pressure variation in a traction cell;

FIG. 5c is a view similar to FIG. 5b showing another system for controlling the air pressure variation in a traction cell;

FIG. 6a is a lengthwise cross-sectional view of another embodiment of the present invention;

FIG. 6b is a transverse cross-sectional view taken along line 6b of FIG. 6a;

FIGS. 7a-7c are transverse cross-sectional views respectively of three additional embodiments of the invention;

FIG. 8 is a transverse cross-sectional view of another embodiment of the invention in which a part of each traction cell overlaps a part of an adjacent cell;

FIG. 9 is a transverse cross-sectional view of another embodiment of the invention using a combination of different cell components or sections;

FIGS. 10a-10i are transverse cross-sectional views of further embodiments of the invention;

DETAILED DESCRIPTION

Figure 1:
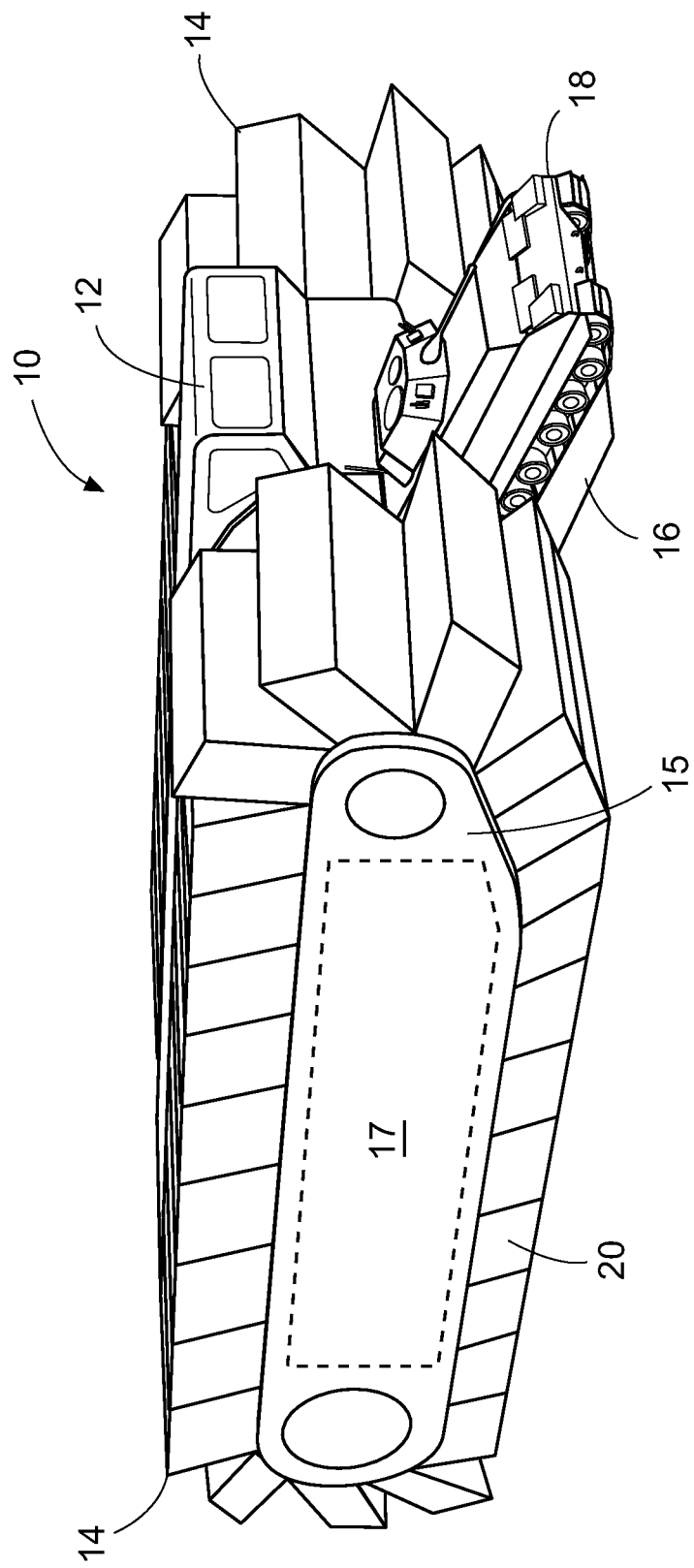
FIG. 1 is a perspective view of an amphibious all terrain vehicle using traction cell structures constructed in accordance with the present invention.

Referring now to the drawings in detail, FIG. 1 illustrates an example of a buoyant track amphibious transporter, also referred to as an amphibious, tracked vehicle, 10 constructed in accordance with the present invention. The transporter/vehicle 10 has a housing or central hull 12 and a pair of propulsion tracks 14 on opposite sides of hull 12. As illustrated the hull 12 includes a ramp 16 for taking cargo 18 on board and/or discharging it. The vehicle is intended to be amphibious and thus watertight so it may operate on both land and water.

Figure 22:
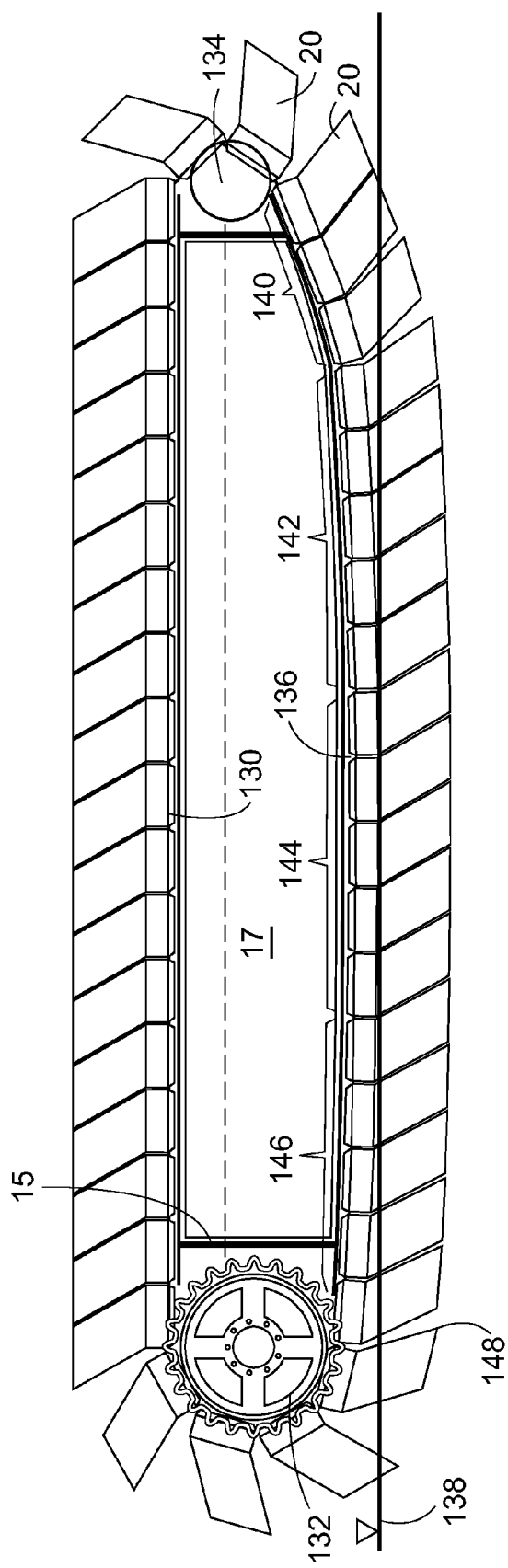
FIG. 22 is a side view of a track profile constructed in accordance with the present invention which, when using traction cells as described herein produces increased thrust and minimizes energy dissipation and drag in water operations.

The propulsion tracks 14 include housings 15 mounted on either side of the hull 12, each of which includes internal watertight chambers 17, shown in dotted lines in FIGS. 1 and 22. These buoyant chambers are surrounded by a chain of traction cells 20 constructed according to the present invention which are shaped for high propulsive efficiency and load carrying abilities in both waterborne and terrestrial modes. The traction cells 20 for the amphibious, tracked vehicle are able to provide all or partial weight bearing in both terrestrial (ground pressure) and waterborne (buoyancy) modes. These cells are also able to provide all or partial means of propulsion and steering in travel across both land and water.

In the preferred embodiment the vehicle 10 is designed so that in its normal mode of operation on water with its design payload the cells 20 provide all the required buoyancy for the vessel so that only the lower run of traction cells 20 are immersed below the water line, as seen in FIG. 22. As a result the housings 15 act as catamarans hulls or amas for the transporter/vehicle hull 12 to provide additional stable displacement because of their distance from the centerline of the vehicle. In addition the vehicle is designed so that the keel of the hull 12 is normally above the waterline when carrying its design payload. This arrangement reduces drag during normal operation and causes the housings 15 to produce additional buoyancy as payload weights increase without relying on hull buoyancy. It also delays the point at which the payload hull keel will become immersed in heavier seas.

Figure 2:
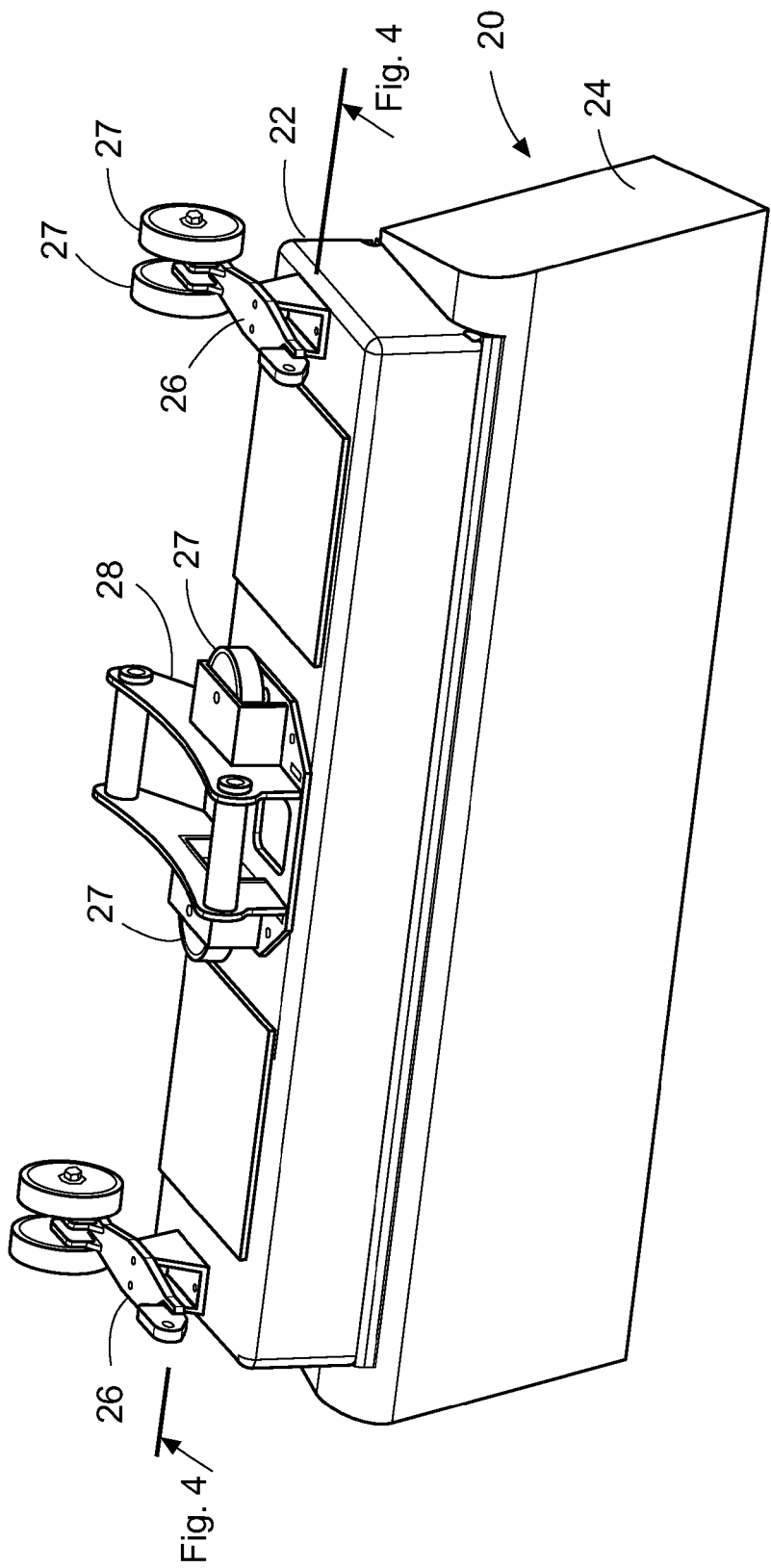
FIG. 2 is a perspective view of a single traction cell of the invention showing the structure for mounting it on the vehicle.

The traction cells 20, which are described in detail hereafter, include a rigid top cap or section 22, as seen in FIG. 2, and a cell portion section 24 whose compliance can be varied.

As used in this specification the term "rigid" as used for the top cap 20 or any "rigid" cell section is intended to mean that the item is formed of rigid materials such as FRP composites, metals and hard plastics.

The term "compliant" means a cell section is isotropic, i.e., is formed of one or more pressurized cell sections or one or more sections of isotropic material, either of which, when compressed, will withstand substantial deformation without damage and then return to its original scope.

The terms "semi-rigid" or "semi compliant" are used to describe a traction cell section that is comprised of flexible material and may include a means for increasing or decreasing its rigidity, e.g. inflated air beams and inflated drop stitch air cells.

Figure 3:
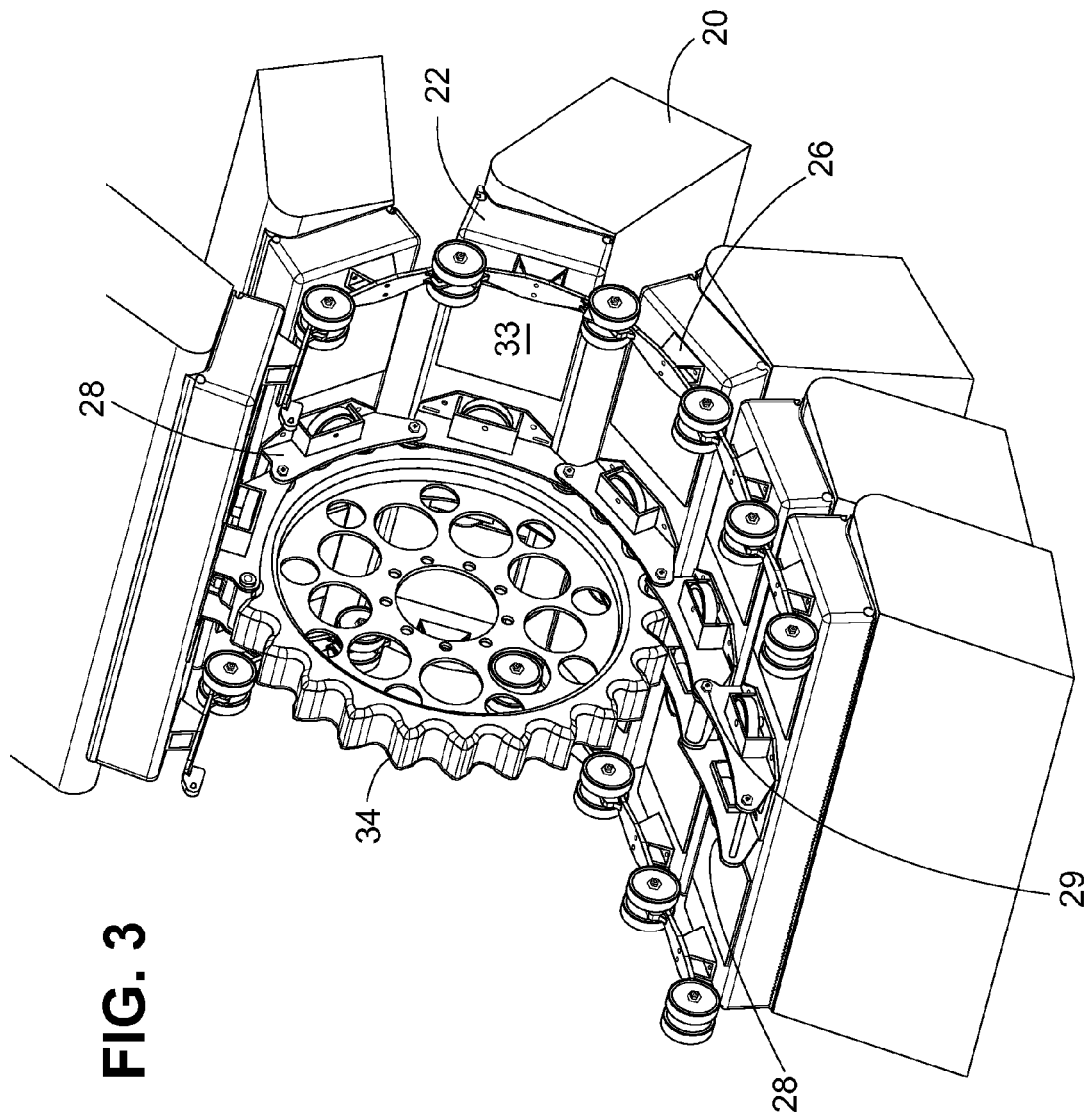
FIG. 3 is a perspective view of a portion of a track using the traction cells of the present invention connected together and engaged with a drive sprocket in vehicle.
Figure 4:
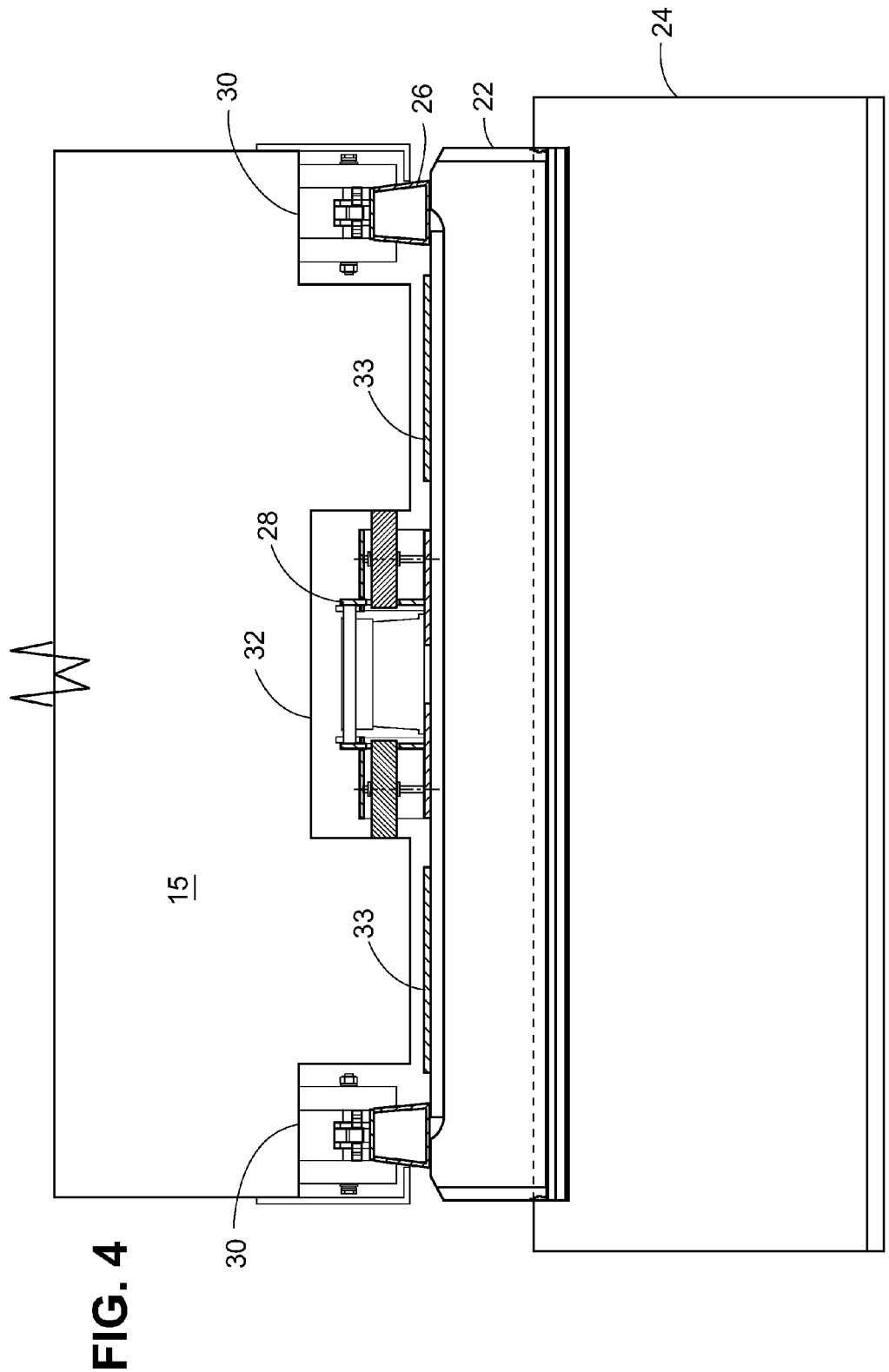
FIG. 4 is a schematic elevational view of the guide track structure in the vehicle which supports and guides the traction cell track during operation of the vehicle.

FIGS. 2-4 illustrate one embodiment of how the traction cells 20 are connected to the vehicle for propulsion. As seen therein wheeled suspension elements 26 are secured to a rigid cap 22 of a traction cell 20 in any convenient manner, e.g. by bolts or the like. The suspension elements 26 include pairs of wheels 27 and each element 26 is designed to be pivotally connected to adjacent elements 26 on adjacent cells 20 as seen in FIG. 4. A central drive train element 28 is also secured to the cap 20 in any convenient manner. The wheeled suspension elements 26 are provided near the outer ends of each cell and are received and ride in channels 30 formed in the housings 15 which define unique generally oval paths of travel for the tracks described in more detail hereafter. The drive train element 28 also has guide wheels 27 which ride in a channel 32 in housing 15 as seen in FIG. 4. Fastening the guide rollers 27 to the traction cells themselves rather than to the vehicle, as is done in the prior art, allows a greater variability in track diameter and improved load distribution on the pontoon-like housings.

FIG. 3 illustrates a plurality of traction cells 20 secured together to form one of the continuous tracks. As seen therein the drive train elements 28 are pivotally connected together in any known or convenient manner, such as by pivot pins 29, to effectively form a chain which engages a sprocket 34 mounted in the vehicle. The sprocket is connected to the vehicle's power plant to drive the chain as would be understood by those skilled in the art. This and other sprockets used to drive or guide the drive train elements are located outside the buoyant housing 15 and driven in any conventional manner by electric or hydraulic motors, or through a waterproof transmission from a diesel engine or the like located in the housing 15 or in hull 12.

As seen in FIGS. 3 and 4 high load reduced friction skid surfaces plates 33, formed of Teflon or the like, are provided to slide along the adjacent surface of the housing 15 (which defines the guide tracks) when the vehicle is carrying high or heavy payloads.

Cells 20 of the present invention are anisotropic, i.e. their stiffness is different in different directions. FIG. 5a illustrates one specific embodiment wherein, as described above, the rigid cap or top section 22 serves as a connection between the cell and the track system. The cap is formed of a rigid material to allow for more effective power transmission from the drive system 28, 34 to the remainder of the traction cell, and also for the transfer of loads on the cell, i.e. hydrodynamic, buoyant, and ground pressure loads, to the vessel track system and housings 15.

In the embodiment of FIG. 5a, the traction cell 20 has a series of air beams 36 located below the rigid cap 22 in the compliant or semi-compliant cell portion or section 24. These air beams may be aligned to form a variety of specific shapes. The advantage of this air beam approach is that it allows for the formation of complex shapes and high rigidity with a very low weight.

The air beams 36 are formed of any suitably strong but flexible material and are encased in a flexible fabric surround or flexible housing 38 whose top end 39 is secured to the rigid top or cap 22 in any convenient manner. The air beams 36 may also be interwoven with a similar flexible material to maintain their desired positional relationship. The air beams 36 may be pressurized by a single input via a pressure manifold 40 connected to a pressurized air source (not shown) by a pressure line 41. In this embodiment the manifold 40 is connected by an air line to one of the air beams 36a, and each of the air beams is pneumatically connected to one or more of its adjacent beams in any convenient manner so that all of the air beams are at the same desired pressure. Preferably the pressure of the air beams may be controlled in any convenient manner such as by the use of relief valves or the like so that the stiffness (compliability) and/or volume of the cell can be varied.

Cell volume also affects the buoyancy and shape of the cell. As a result these characteristics of the cell can be adjusted prior to each mission or even mid-mission. In general, the pressure distribution is designed such that a uniform pressure is applied to the rigid upper section 22. Additionally, the lower section (in closest contact with the ground) is of lower pressure to allow for compliance when running over obstacles. In addition, a sole section 42 formed of compliant material is secured on the bottom of the cell. It also may be formed of a material that can serve as an armor to obstacle puncture hazards.

FIG. 5b illustrates one form of control system for maintaining a variance of pressure in the section 24 of traction cell 20. In this case the manifold 40 is connected to a series of pressure regulating valves 43 of known construction each of which is set to allow a different pressure to be applied to each of the four layers of air beams 36 in the cell. The valve associated with supply line 43a allows the highest pressure into the air beam 36 in the top layer it is connected to and that beam is connected in any convenient manner to the other two beams in that layer so they are all at the same pressure. The valve connected to the supply line 43b allows a somewhat lesser pressure into the air beam 36 it is connected to in the next level of beams which are all pneumatically connected together so they are at this lesser pressure. Thus these top two layers with high pressure in their beams may be regarded as semi-rigid or semi-compliant. Likewise the supply lines 43c and 43d apply successively lesser pressures to their layers of beams. Thus these lower layers may be considered compliant. Here again these air beams are all encased in a flexible fabric surround or housing 38 connected to the cap 22.

FIG. 5c illustrates another embodiment of this structure where a single air supply line is connected from the air manifold to the top layer of air beams (which are all connected together and at the same pressure). The successive layers of air beams are then connected by pressure regulating valves 45, each of which allows successively less pressure to be supplied to the layers below. In these embodiments the successive layers of cells have individually controlled pressures which may be varied as required for a particular mission. Thus the top layers may be pressurized to be semi-rigid and one or more of the lower layers to be compliant. Alternatively the air beams may be connected through these pressure regulator valves so that the pressure gradient is applied to different areas or groups of cells rather than different layers. Here too the air beams are encased in a flexible fabric surround connected to the cap 22 and may have a sole section 42 formed of compliant material.

By way of example, in one embodiment of the invention, the rigid cap or top 22 can be made of a graphite fiber reinforced plastic (RFP) or similar light weight material, the flexible high strength textile perimeter housing 38 and interwoven fabric may be made of a polymer-coated para-aramid fiber textile similar to TurtleSkin® made by Warwick Mills, with a polymer coating such as polyurethane or other proprietary coating. The armored sole 42 may consist of further reinforced materials similar to the perimeter housing 38.

In one application of the invention as shown in FIGS. 1-5, which has been designed as amphibious, the vehicle 10 may be approximately 90 feet in length, 48 feet in beam, and 26 feet in height. The vehicle is able to operate at 10 knots in water and 3 mph on land with a payload capacity of 170 LT. The vehicle contains two buoyant tracks using cells of this invention. Each cell is approximately 4.5 feet in width, 16 feet in beam, and 6.5 feet in height. The pressure in the air beams within an individual cell varies for example from 5 psi towards the bottom of the cell to 30 psi towards the top of the cell.

Another embodiment of the invention is illustrated in FIG. 6a. In that embodiment, air beam inflatable chambers 36 are arranged longitudinally (i.e. in the direction of travel of the vehicle, see FIG. 6b) instead of transversely as in the embodiment of FIG. 5. As in the prior embodiment, the embodiment of FIG. 6a includes a rigid cap 22, with the air beams 36 enclosed by a flexible perimeter cover or housing 38. In addition smaller air beams 37 can be provided between air beams 36 to help maintain stability of the beams in the desired shape.

Further embodiments of the invention are shown in FIGS. 7a-7c. These embodiments may include separate semi-rigid sections 50 on top of a light weight and compliant section 52. The buoyant semi-rigid section 50 may be formed of a single inflatable inner tube, foam, or any lightweight material with the desired stiffness, weight, and size to transmit loads between the cell's more compliant lower section 52 to the semi-rigid section 5a and thus to its more rigid upper section or cap 22. The embodiment of FIG. 7a uses smaller longitudinally arranged air beams 36 similar to those described above for the embodiment of FIG. 6 in the compliant section 52. The traction cell of this embodiment is connected to the track, through the rigid cap 22 (shown smaller in these embodiments).

The embodiments of FIGS. 7b and 7c include a tougher, puncture resistant section 54 further protected by a puncture resistant lining 42 at the bottom of the cell. In addition these embodiments of FIGS. 7b and 7c include transverse air beams 36 in the section 52 which is described above with respect to the embodiment of FIG. 5. They also include additional smaller air beams 37 to fill in the space defined by the flexible perimeter housing 38 as needed. The puncture resistant section 54 of these embodiments include smaller air beams 39 (FIG. 7b) or a layer of isotropic foam like material 58 (FIG. 7c) along with an armoured sole material 42.

The buoyant light weight sections 52 containing air beams 36 and 39 can be pressure regulated as described for the embodiment of FIG. 5 to control their compliance.

FIG. 8 illustrates a modified embodiment of the previously described embodiment of FIG. 7b. In this embodiment the puncture resistant sections 54 are slightly offset from their light weight compliant sections 52 so that they overlap the bottom of the light weight section 52 of the cell in front of it in the direction of travel. This arrangement will resist the movement of debris into the small gaps between the cells.

Yet another embodiment of the invention is illustrated in FIG. 9. In this embodiment, a cell 60 is provided having a hollow rigid vehicle traction cell shell cap 62 containing an inflatable inner tube structure 50 (similar to the embodiment of FIG. 7a) which acts as a semi-rigid structure to transmit pressure from a more compliant lower semi rigid or semi compliant section 63 to the cap 62. The more compliant semi rigid or semi complaint section 63 is formed of a drop-stitch air inflatable cell 64 as a buoyant chamber. The drop-stitch technology was first patented in the 1950s and consists of layers of fabric held together with a matrix of threads, allowing the fabric to collapse when deflated. A tread formed of a compliant cell section 65 is provided at the bottom of the cell 60. The compliant cell section 65 is formed of closed cell isotropic foam 66.

The semi-rigid cell section 63 is surrounded by a flexible cover 67 which secures the cell section 63 to the rigid cap 62 through a bolt rope 68 received in a groove 69 in cap 62. Likewise the closed cell compliant foam tread cell section 65 is enclosed in a flexible cover 70 similar to that of housing 38 described above which also covers the compliant semi-rigid section 63 and is secured to cap 62 in a groove therein by a bolt rope 71. Finally, an armored tread 42 is secured in any convenient manner to the flexible cover 70.

As exemplified by the above described embodiments, cells of the present invention are generally formed with a rigid section at the top to allow for power transmission from the drive system to the cell, and load transmission from the cell to the vehicle track. Additionally, a compliant puncture-resistant section is placed on the bottom of the cell to act as armor to puncture hazards. Between the rigid load transmission section at the top and the protective tread at the bottom of the cell, there preferably is semi rigid section having a gradient in pressure (and thus stiffness or compliance) running from a lower pressure, more compliant portion at the bottom of the cell that allows for compliance when running over obstacles, to a semi-rigid, less compliant section at the top of the cell that transmits a more uniform pressure to the rigid portion of the cell. This vertical gradient in pressure (as well as a pressure gradient in directions other than vertical, as will be later discussed) can be created through a number of means. For example, a series of pressurized air beams regulated by a single input pressure manifold (as shown in FIG. 5) can be used to create a varying pressure gradient. Alternatively, the material composition of the cell components may be of different materials to provide different stiffness in the cell (as shown in FIG. 9). For example, a series of air-inflatable chambers can form the lower compliant portion while closed-cell foam can form the semi-rigid portion above the compliant portion. As a further example, a softer foam can be used in one portion of the cell, a medium foam in another, and a firmer foam in another portion of the cell.

Figure 10C:
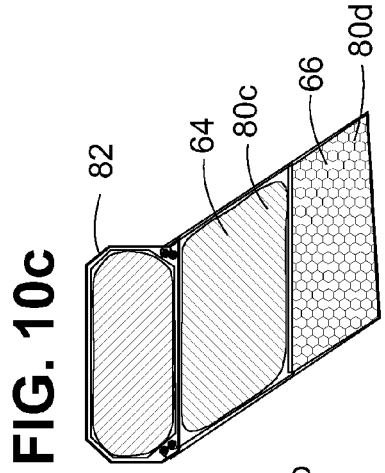
Figure 10B:
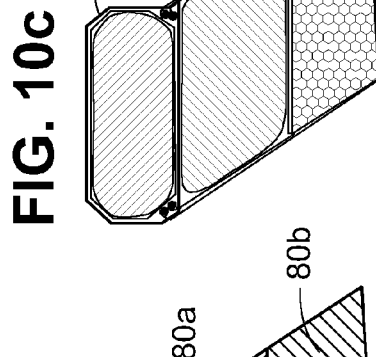
Figure 10A:
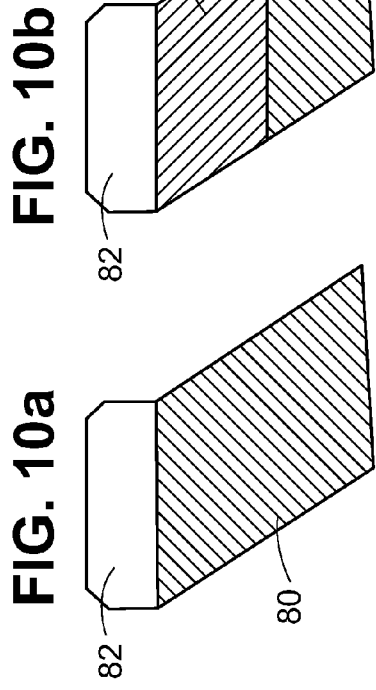

FIGS. 10a-10i illustrate a variety of alternative embodiments of the invention using other structural arrangements to vary the composition, and thus the pressure (and compliance or stiffness) within the traction cells 20 (not just in the vertical direction). Thus the traction cells can be a combination of buoyant compartments generally designated 80 in the Figures and rigid caps 82 similar to cap 22 discussed above. The buoyant compartments 80 in these embodiments may be made of low density (and thus buoyant) material, that can be inflatable (or not), that can be compliant or semi-rigid but which are more compliant than the rigid sections or caps 82. Specific embodiments include: a cell with a single buoyant compartment 80 containing a foam block or air beams as shown in FIG. 10a (of which FIG. 5 is one variant); a cell with multiple buoyant compartments 80a and 80b, as shown in FIG. 10b (of which FIG. 7a is a variant) and a cell containing a rigid cap 82 containing an air beam and two lower compartments 80c and 80d as shown in FIG. 10c (which is similar to the embodiment of FIG. 9).

Figure 10G:
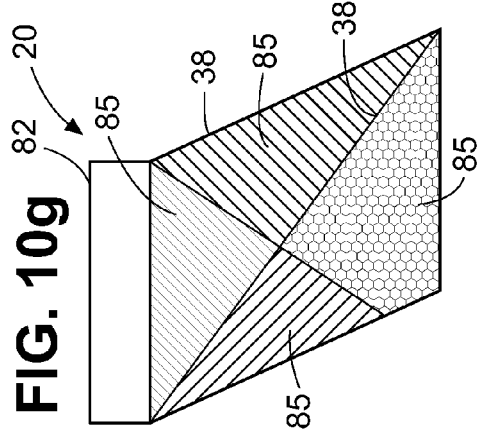
Figure 10F:
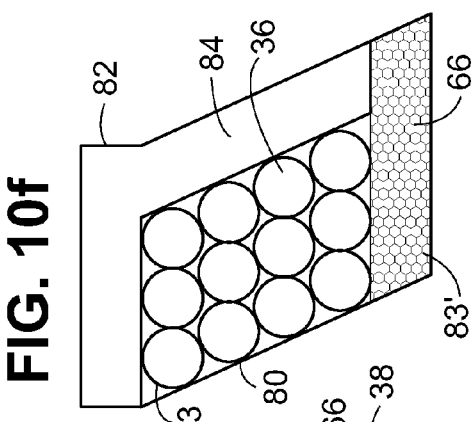
Figure 10E:
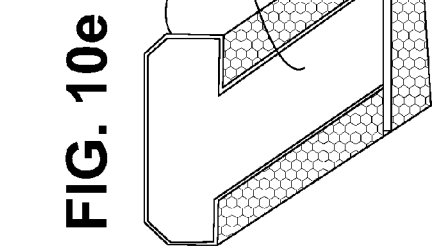
Figure 10D:
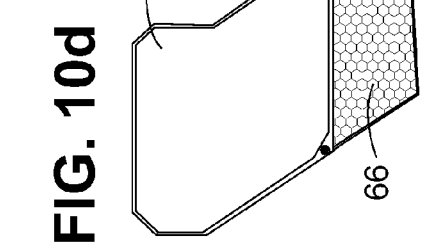

FIG. 10d illustrates a cell having a large rigid top portion or cap 82 (which may or may not include a buoyant tube) and a buoyant low density compliant cell section or compartment 66 secured to the rigid portion 82 by bolt ropes as described above. FIG. 10e illustrates a traction cell having a rigid portion or cap 82 that includes a leg 84 projecting downwardly within the cell and surrounded by buoyant low density isotropic material 66 contained within the flexible cover material 38.

The embodiment illustrated in FIG. 10f has a rigid extension 84 of the cap 82 that extends along the forward face of the cell and a semi rigid section or compartment 80 which defines a buoyant compartment 83, 83' containing air tubes 36 and low densely buoyant isotropic material 66 respectively so compliance can be varied.

The embodiment of FIG. 10g illustrates a traction cell 20 which is divided into four compartments 85, separated, for example by fabric 38, with each compartment capable of containing a different arrangement of material, e.g. air tubes inflated to different pressures or low density cellular material having different degrees of flexibility and/or buoyancy.

FIG. 10h is a more detailed view of a traction cell similar to that described above with respect to FIG. 10f. Here the rigid cap 82 includes a leg 84, a cell section 83 containing a plurality of inflatable tubes or air beams 36 and an isotropic foam section 92 contained within a fabric cover 38 secured to cap 82 by bolt ropes 94. An armored tread 42 is also provided as described above.

FIG. 10i shows a similar structure where, in lieu of air tubes or beams 36 two different semi rigid foam materials 96, 98 are used behind leg 84 and a third softer isotropic compliant foam 99 is used in the base. In one embodiment foam 96 is more rigid than foam 98. These components are contained within the fabric cover 38 secured to cap 82 by bolt ropes 94.

Alternatively a traction cell may have multiple segments, some containing buoyant compartments, some containing rigid compartments, or be a traction cell in which the structure is rigid and external to the buoyant compartments as shown in FIGS. 9, 10h and 10i.

In any of the configurations shown, a textile fabric can enclose all the semi rigid and compliant components of the traction cell, or be interwoven among the components to maintain its structure. Also, any of the traction cell designs can be combined with a rigid cap for connection with the vehicle track and/or an armored tread for puncture protection from obstacles.

Figure 11B:
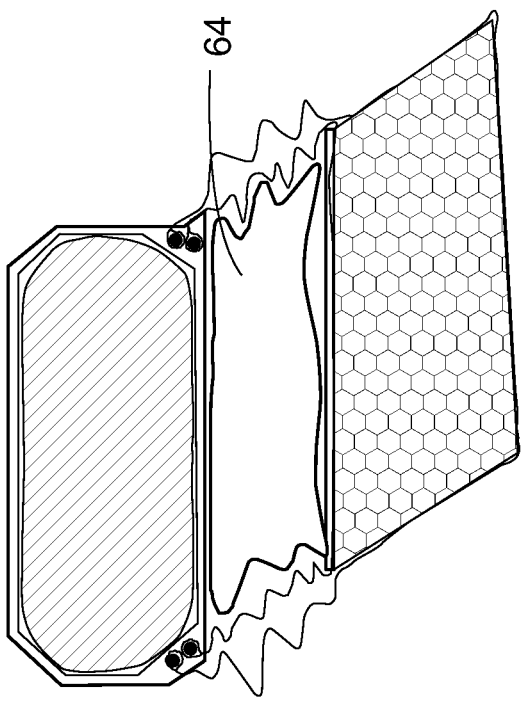
FIG. 11b is a view similar to FIG. 11a but with the central traction cell section deflated.
Figure 11A:
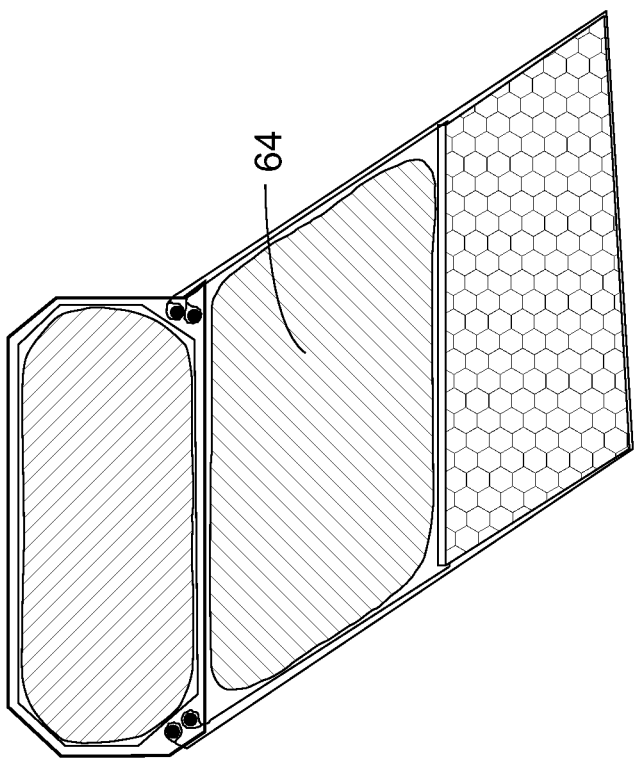
FIG. 11a is an enlarged view of the embodiment of FIG. 10c, with the central traction cell section inflated.

Inflatable chambers provide the benefit of controlling the volume, and thus the buoyancy and size of the traction cell. FIGS. 11a and 11b are enlarged views of the embodiment of FIG. 10c. FIG. 11a shows the traction cell fully inflated to maximize its volume and FIG. 11b shows the section 64 deflated to minimize its volume.

Figure 12B:
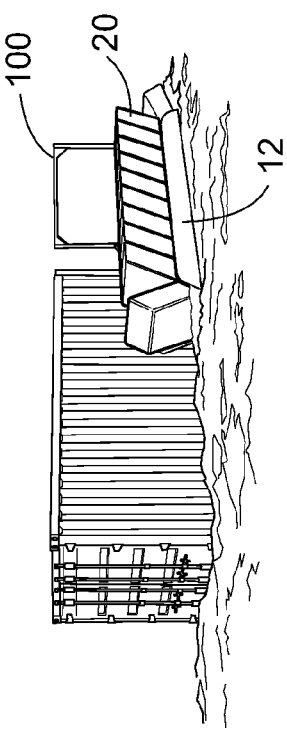
FIGS. 12a and 12b are schematic side views of an amphibious cargo vehicles using the traction cells of FIGS. 11a and 11b with the cells inflated and deflated respectively.
Figure 12A:
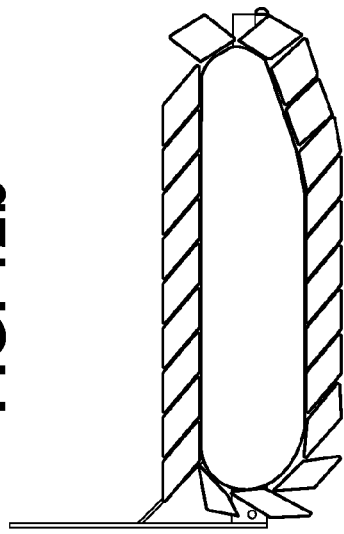
Figure 13:
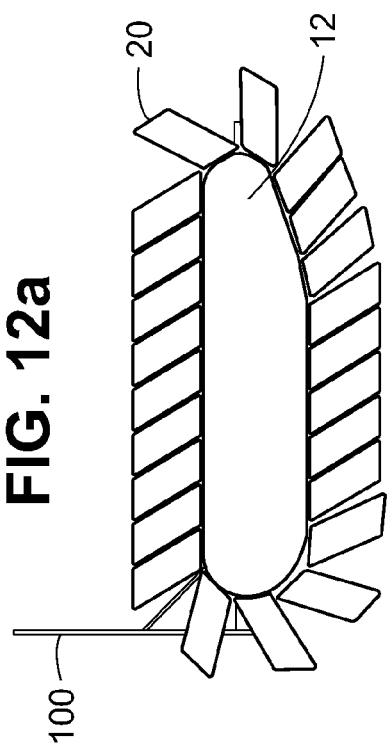
FIG. 13 is a perspective view of two of the vessels as shown in FIG. 12a wherein one has all its cells fully inflated and the other has only its bow cells deflated to allow off loading of cargo.

An amphibious tracked vehicle using the air-inflatable traction cells of FIGS. 11a and 11b with its cells inflated and deflated is shown schematically in FIGS. 12a and b. This vehicle, as also seen in FIG. 13 has a deck formed in its hull between the two tracks using cells of the present invention and a pivotable ramp 100 at its aft end. As seen therein the capability of deflating the cells will minimize the vehicle's overall size for storage and transport.

As also seen in FIGS. 12a and 12b the shapes of the path of travel of the track on the vehicle are preferably designed so that the cells 20 are largely separated at the transom or aft end of the vessel and largely together at the bow during entry into the water. Additionally, the track is designed such that the angle of attack of the traction cells at the stern is controlled. This allows for smooth water flow into spaces between the cells and allows generation of the maximum amount of thrust. The ratio of cell tip speed to root speed and rate of separation between traction cells can also be controlled via the track shape. The shape of the track at the bow is designed such that during water entry, the cells are not separated. This prevents the cells from slamming the water surface upon entry when operating ahead. When operating astern, the shape of the track prevents, by squeezing the traction cells together, a fountain that would otherwise engulf the bow of the vehicle. Additionally, the traction cell closure prior to water entry and their nesting along the bottom portion of the track maximizes buoyancy (when waterborne), minimizes ground pressure (when on land), and also minimizes the capture of debris and pan ice.

The track path is further shaped so that on the top and bottom of the track the traction cells have a specific amount of separation. This designed separation ensures that minimal drag and maximum thrust are produced as the traction cells are pushed through the water. Further, the bow of the track is designed such that during entry, the cells have as little separation as possible to prevent slamming of the cells in the water on reentry. Any sudden collapsing between traction cells at the bow will lead to a decrease in the available volume that will lead to water being quickly ejected. This sudden change will generate a large amount of drag and reduce the overall efficiency of the vehicle. This structure also minimizes entrapped water when operating astern.

Figure 14:
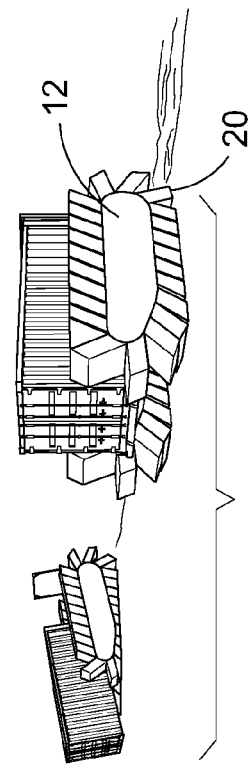
FIG. 14 is a perspective view of the vessel of FIG. 12a with the air beam structures in the traction cells on the lower flight only of the track deflated to reduce buoyancy and allow in water loading and unloading.

Maximizing buoyancy during operation in water maximizes payload capacity, and allows the vehicle to have a shallower draft, thus reducing hydrodynamic drag on the vehicle. Deflation or partial deflation of the traction cells results in loss of buoyancy, and the vehicle can sink lower in the water to allow in-water load-in and load-out as shown in FIG. 14. On land, deflation of the traction cells at one end of the vehicle tilts the craft as shown in FIG. 13 to allow for off-loading of a payload (by backing away). Inflatable chambers within the traction cells also reduce weight of the vehicle for the same volume and allow stiffness of the cell to be controlled.

The traction cells of the present invention as described above are shaped such that the propulsive efficiency in driving the vessel when waterborne is higher than that produced by rectangular shaped traction cells. The shape of the aft (thrust) face of the traction cell is optimized for hydrodynamic thrust. FIGS. 15a-f show schematic side views of various traction cell shapes that include: a conventional rectangular shape as in FIG. 15a; an arced traction cell shape swept generally aft, relative to the lower, forward-most edge of the cell, as in FIG. 15b; a parallelogram type traction cell shape swept generally aft as in FIG. 15c; a traction cell shape swept generally aft with a vertical upper portion 101 as in FIG. 15d; a similar shape as in FIG. 15d but with a trimmed lower forward corner 102 for improved movement in reverse as in FIG. 15e; an arced traction cell shape swept generally aft with a short vertical shoe 104 at the bottom of the cell also for better movement in reverse and ease of construction of the armored sole as in FIG. 15f. The back edge of the shoe section 110 also acts as a hydrodynamic interceptor which functions to generate increased thrust.

Figure 15A:
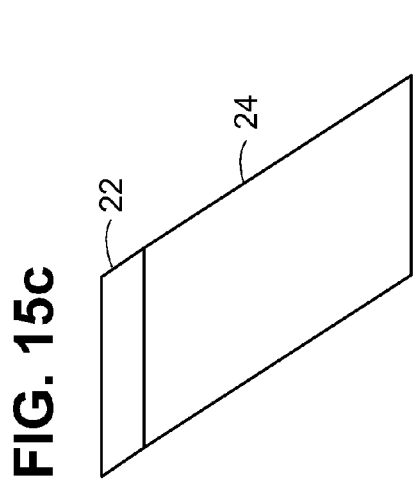
FIGS. 15a-15f are schematic illustrations of traction cells according to the present invention formed in varying nestable shapes.
Figure 15B:
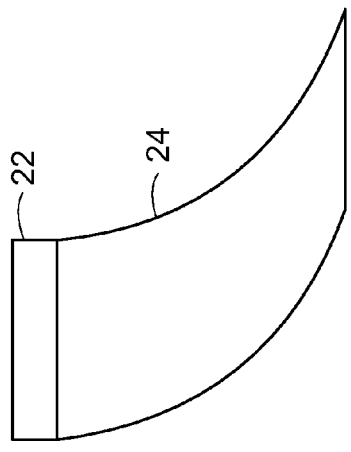
Figure 15C:
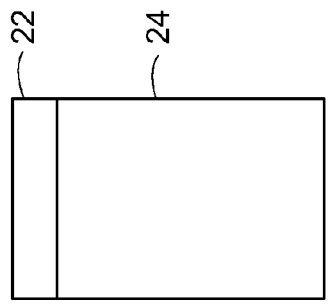
Figure 15D:
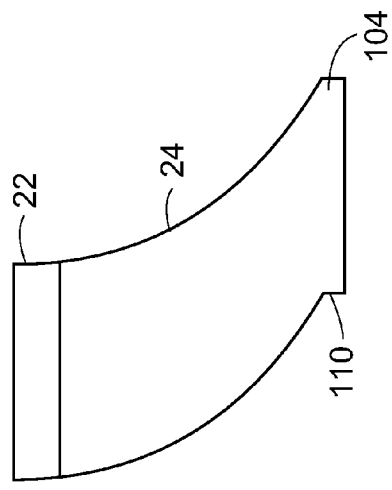

Although the rectangular traction cell cross-section in profile shown in FIG. 15a is possible, it has been determined that a better-performing shape is swept generally aft (as in FIG. 15b through FIG. 15f). In some of the embodiments shown, the angle of the aft face with the vertical is approximately 33 degrees, but is preferably 30 degrees if air cells of uniform diameters oriented transversely are used, as depicted in FIG. 4. The rake angle of the back swept face can range widely, and can be changed for instance if air cells of varying diameters are used.

Figure 17B:
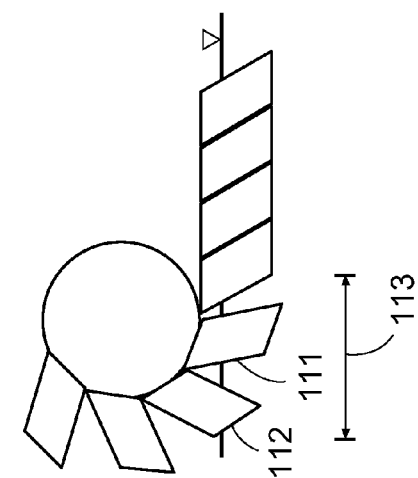
FIGS. 17a and 17b are schematic views of the aft end of a vessel using traction cells according to the invention for propulsion, with FIG. 17a showing rectangular cells and FIG. 17b showing raked or swept back parallelogram shaped cells.
Figure 17A:
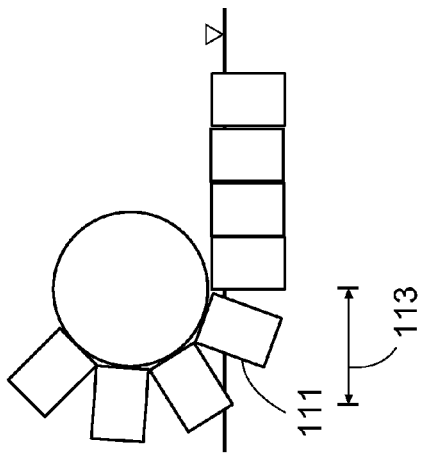

FIGS. 17a and 17b show a part of a vessel floating in the water, with the vessel of FIG. 17a using rectangular cells and the vessel of FIG. 17b using raked cells. These figures demonstrate that a traction cell rake according to the present invention provides more thrust during waterborne travel because the aft (thrusting) surface 111 of the traction cell is near vertical during the region of travel just before the cell leaves the water, providing a more favorable thrust line. Furthermore, the swept cell has a longer thrusting distance 113 as compared to the rectangle cell. Still further, some additional thrust is obtained from the traction cell bottom surface 112 as it moves toward the water surface. The generally aft swept traction cell also provides more stern lift (compared to the sinkage obtained from a rectangular cell), due to the lifting component of thrust from the aft and bottom traction cell faces. Finally, the fountain of water created from cells leaving the water and traveling up and around the track is smaller with the aft-swept cross-section due to its near vertical cell face at the water exit. Thus the aft swept cell has less wasted torque lifting the water, less additional water weight to carry, and provides for a dryer deck.

Figure 16A:
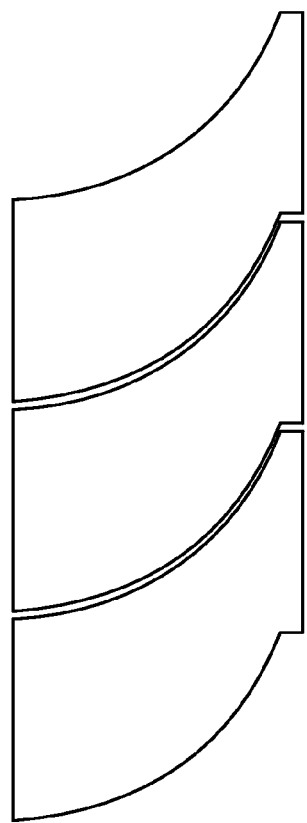
FIGS. 16a-16c are schematic illustrations showing several of the traction cells of the embodiment of FIGS. 15f and 15c respectively nested together.
Figure 16C:
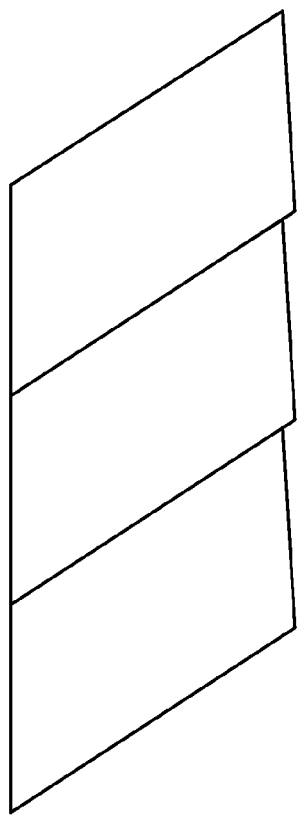
Figure 16B:
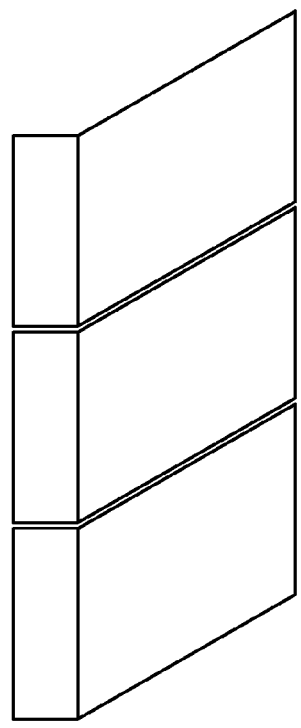

The forward faces of the traction cells of the present invention are shaped to nest with the aft face of an adjacent cell to maximize buoyancy and minimize ground pressure. Three embodiments of traction cells in their nested condition are shown in FIGS. 16a-c. As seen therein the swept-back shapes, in profile, have virtually identical fore and aft shapes allowing adjacent traction cells to nest while positioned along the baseline portion of the track. This nesting feature maximizes buoyancy, thus reducing vehicle draft and drag during waterborne travel. It also minimizes ground pressure on land. The nesting feature of the traction cells is also advantageous at the bow of the vehicle. In forward operation, it is desirable for cell separation to be minimal during water entry to reduce slamming on the cells at the bow. This is seen in FIGS. 1 and 12a which show that the cells are close together where they enter the water line in forward operation. In reverse operation, it also is desirable to minimize traction cell separation so that water between the traction cells that would otherwise create a fountain is expelled due to closing of the gap between cells during water exit at the bow, as seen in FIGS. 12 and 17.

The preferred shape of the track path for the traction cell structures of the present invention is shown in greater detail in FIG. 22 which is an enlarged side view of the vehicle shown generally in FIGS. 12a and 12b. The track path is defined by the channels 30 formed in the buoyant pontoon housings 15 (or in any other convenient manner) to include a relatively flat upper flight 130, a large aft drive sprocket 132 and a smaller forward guide sprocket 134. The lower flight 136 of the track path as defined by the channels 30 has several distinct sections which control the position of the traction cells 20 to achieve their above described relative positions as they enter and exit the waterline 130.

As seen in FIG. 22 the guide sprocket 134 is located substantially above the waterline 138. The forward end 140 of the lower flight path as defined by channels 30 extends generally tangentially from the periphery of the sprocket 134 so that the opposed faces of adjacent traction cells close against one another as they round sprocket 134 and before they enter the water. This reduces drag on the vessel as compared to if the traction cells were separated as they entered the water. This is particularly true when the vessel is operated in reverse.

By having the traction cells closed before water entry that entry is smoother and minimizes energy dissipation by not having the vertical faces of the traction cells enter the water. This structure also reduces buoyant lift at the bow so the vessel moves through the water with less up pitch and less drag. In addition the angled positioning forward aids the vessel in negotiating obstacles on land.

The next section of the track path 142 is also substantially straight but with a lower angle of attack to complete the immersion of the traction cells in the water and guide the cells to the third track section 144 which is flat and straight. This presents a continuous flat bottom face of the cells to the water to reduce drag or slip.

The last section 146 of the track path is slightly curved to transition the cells from flat section 144 to the tangent of the drive sprocket 132. This curvature causes the traction cells to initiate separation in the water before reaching the sprocket. This allows water to slowly enter the space formed between the hidden cells and thereby produce less suction forces on such filling which would otherwise resist motion of the traction cells. This effectively increases thrust. In addition this shape aids in moving the vehicle in reverse on land as the leading edges 148 of the traction cells do not impact and dig into the ground surface.

Figure 15E:
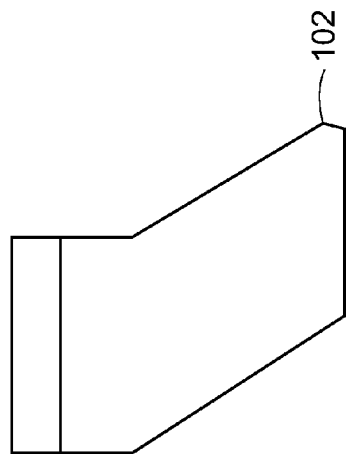
Figure 15F:
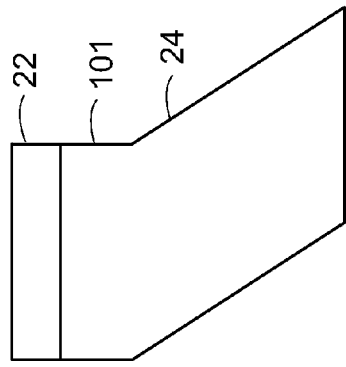

The lower surface of the various cells of the invention can be generally flat and parallel to the vehicle baseline to provide the maximum footprint leading to the lowest ground pressure for a given weight and the highest prismatic coefficient for a given buoyancy. In another embodiment, the lower forward corner of the cell face may be modified as shown in FIG. 15e and FIG. 15f to reduce the chances of catching this corner while reversing on a hard surface.

The combination of rigid, semi-rigid and compliant sections used to form the traction cells of this invention, along with the at-rest shape allows for a shape when hydrodynamically loaded that has a high propulsive efficiency. The inflatable sections allow for definition of a specific shape while reducing the overall weight of the cells. In this context, propulsive efficiency would be the amount of thrust produced for a given traction cell aft-face area; thus the efficiency would be pounds per foot squared, or Newtons per meter squared. If the baseline thrust were considered as a fully-rigid cell with rectangular cross section, the efficiency of a new traction cell would be the thrust of the new cell shape divided by the thrust of the rectangular cell shape. Thus, a hydrodynamic efficiency of greater than one would be an improvement and less than one would be a detraction.

Figure 18:
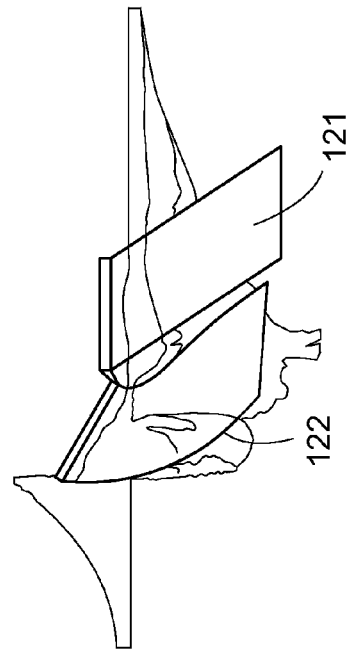
FIG. 18 is a schematic view of the track shown in FIG. 17b showing the configuration of a semicompliant traction cell under dynamic load to propel the vessel.

The compliance normal to the aft face of cells formed according to this invention may also be optimized for hydrodynamic thrust. This is illustrated schematically in FIG. 18 wherein closed foam traction cells 121 are shown in side view transitioning from their normal track position to moving around the circular end of the track and producing thrust on the vessel. The structure of the cells allow for compliance of the cell when under hydrodynamic load 122. This compliance can be designed based on the known hydrodynamic loading of the cell to produce a shape that provides the maximum hydrodynamic efficiency.

Figure 19:
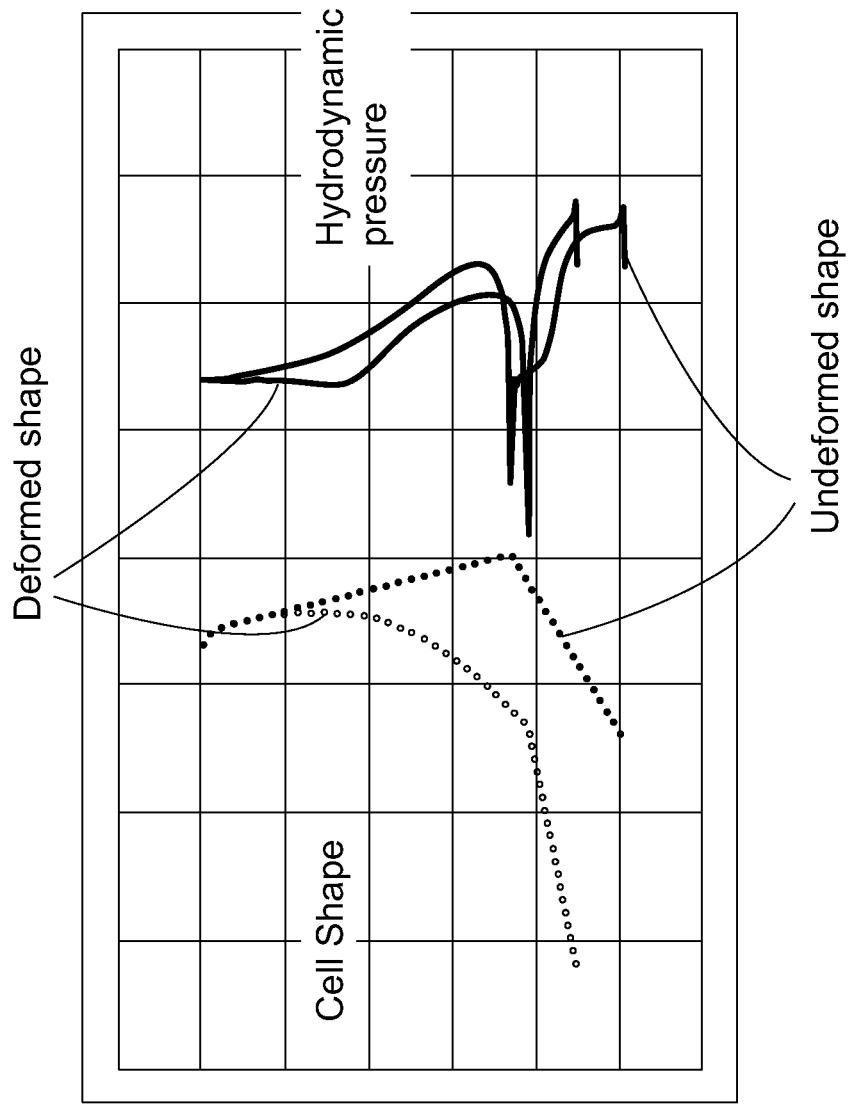
FIG. 19 is a plot of hydrodynamic pressure on the traction cell face showing how that pressure is affected by the cell shape.

The graph in FIG. 19 illustrates that the hydrodynamic pressure distribution can be changed by allowing different shapes to form. In general, the cells can have separate rigid structures, foam sections, and air filled inflatable cavities. The air cavities, along with specific degrees of material stiffness will lead to a system that forms the ideal shape when operating at speed. The traction cell initial shape and internal air cavities can be designed such that the deformed shape is appropriate for specific missions. In this embodiment, a convex shape 122 is the end result. However, the traction cells can be designed such that a flat, convex, or concave, thrust surface is used.

As noted above, the shape of the traction cell of the present invention is generally a swept back shape. However, the undeformed shape and the location of the air beams/rigid blocks/foam cell components work in conjunction to create a new shape at speed that generates the maximum amount of thrust for a given power input. This is accomplished by making an aft face and bottom face that creates a direct thrust line as described above. The pressure distribution (as shown in FIG. 19) can be changed by allowing for differing deformed shapes. The ideal pressure distribution, when integrated over the entire face of the cell, would generate the most force for a given cell initial shape. In general, there will not be a single optimal final shape; this will depend on vessel speed, track speed, vessel loading, and vessel size. Additionally, through varying cell compartment densities, the traction cell can be made to remain in the water for as long as possible for each power stroke. This is done by effectively elongating the traction cell during the rotation through the water. The combination of thrust line, integrated pressure distribution, and time in the water can lead to increased thrust for a given cell size, initial shape, and weight.

Figure 20A:
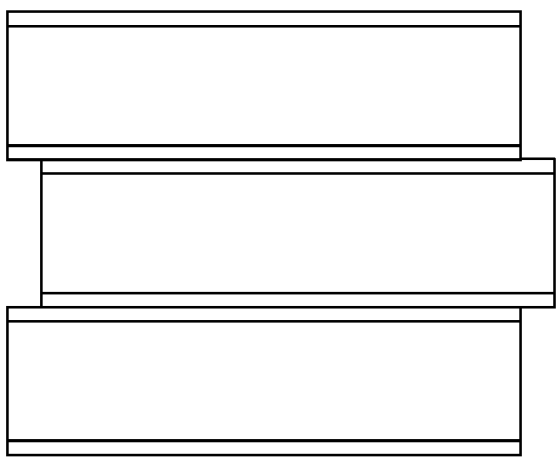
FIG. 20a is a plan view of a plurality of traction cells according to the invention arranged to be laterally offset to provide additional thrust.
Figure 20B:
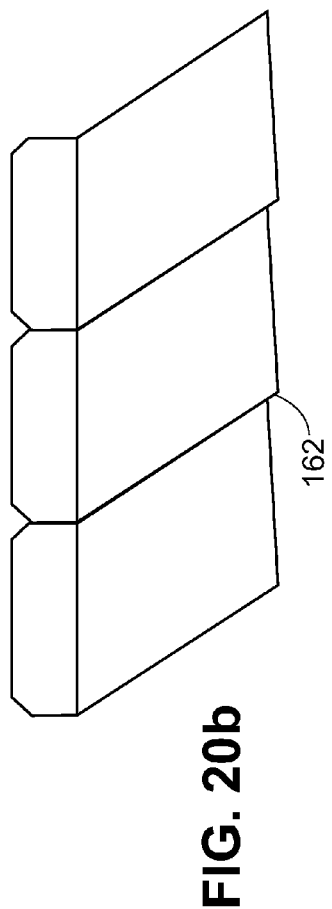
FIG. 20b is a side view of a plurality of traction cells according to the present invention vertically offset to provide additional thrust.

As described above the traction cells of this invention are typically mounted in alignment in plan view as seen in FIGS. 1 and 3. However, they may also be staggered laterally across the track width as shown in the plan view of FIG. 20a. Lateral staggering is achieved by offsetting the connection mechanism as shown in FIGS. 2-4 so that alternate traction cells are off-center with respect to the track connection components. The traction cells can also be staggered vertically as seen in the side view of FIG. 20b by changing the shape of the cell bottom or providing varying offsets on the track connection mechanism. This would expose a rear part 162 of the traction cell to provide additional thrust. Staggering can be used when propulsive thrust from the cells acting as paddles may not be sufficient for a given track speed (due to slippage). Slippage can be defined as the speed of the cells through the water is faster than the speed of the vessel through the water in the opposite direction. If slippage were zero, the cells would move aft at the exact speed that the vessel moves forward. It has been found that the track arrangement as described with respect to FIG. 22 achieves essentially zero slippage.

Figure 21:
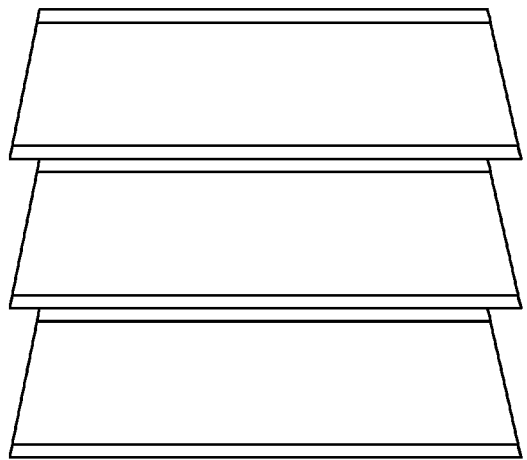
FIG. 21 is a plan view similar to FIG. 20 showing traction cells having a frusto-pyrimidal shape in plan to also provide additional thrust.

Traction cell stagger along the track length can provide additional thrust (for a given track speed). This is possible because part of the cell is now visible to the fluid when running along the bottom of the tracked vehicle. This visible face will push on the water, creating a net force in the opposite direction. Alternatively, the traction cells can be made asymmetrical in plan-view allowing for a saw-toothed shape as shown in FIG. 21 thereby also exposing part of the cell edge to the fluid push against the water.

Although all load-carrying, propulsion, and steering is possible using traction cells of this design, auxiliary means of load-carrying, propulsion and steering can also be used in conjunction with the traction cells of this design. For example, during waterborne travel, additional propulsion units, like outboard motors, can be dropped in the water when required. A rudder may also be added to assist with steering. Additional components may be used to supports loads such as additional buoyancy aids or air cushions in water, or additional tires on land. A trim tab or aft lifting body (ALB) may also be used to add stern lift in waterborne travel.

The traction cells of this invention are extremely flexible in design, easily scalable and modified. They can be tailored to specific application requirements. For example, given a lighter or heavier payload condition, the size of the fraction cell (in any dimension) can be modified by lengthening or shortening, or adding or subtracting internal components of the cell. Smaller or larger scaled versions can be achieved by using smaller or larger components, or increasing or decreasing the number of internal components.

A combination of the track shape, running attitude, traction cell shape, cell compliance, ease of construction, payload, and mission objectives must be taken into consideration when selecting the cell design, keeping in mind the factors mentioned earlier for efficient propulsive thrust on land and in water.

Although the invention has been shown and described herein with reference to the various embodiments, various changes and modifications may be effected therein by those skilled in the art without departing from the scope and spirit of the invention.

What is claimed is:

1. An amphibious, all-terrain vehicle comprising a housing having a bow, a stern transom and a design waterline and including a continuous guide track, at least one track drive train for propulsive movement in the guide track including a plurality of traction cells for moving the vehicle in forward and aft directions of travel relative to its bow and stern, said traction cells each comprising a first, rigid top cell section for connection with the track drive train, and a second cell section including at least one semi-rigid cell section which is less rigid than said first, rigid top cell section and is connected to said first, rigid top cell section, said second cell section having a bottom surface; said second cell sections of the traction cells each including a pair of complementary faces extending from its respective first, rigid top cell section transversely of the direction of travel of the vehicle with said bottom surface of the traction cells extending between them, and said rigid cell sections being pivotally connected to each other to form a propulsion drive track with complementary faces of adjacent traction cells moving between minimum and maximum separation distances as said traction cells move around said guide track and said guide track being shaped so that adjacent bottom surfaces of said second cell sections pivot away from each other as said traction cells exit through the design water line at the transom to produce thrust for the vehicle from one of the complementary faces thereof and adjacent bottom surfaces and complementary faces pivot toward each other to the minimum separation distance at the bow before entering the waterline to prevent the complementary surfaces of said traction cells from impacting the water during cell entry at the waterline and to limit entrapped water between the complementary faces when operating astern.

2. A vehicle as defined in claim 1 wherein each of said at least one said semi-rigid cell section includes a plurality of inflatable air beams and a flexible cover containing said beams.

3. A vehicle as defined in claim 2 wherein said complementary faces of said semi-rigid cell sections form thrust surfaces which are raked relative to the vertical.

4. A vehicle as defined in claim 3 wherein each of said semi-rigid cell sections includes a shoe section located between said air beams and said bottom surface; said shoe section having a vertical rear surface for providing additional thrust in water.

5. A vehicle as defined in claim 4 wherein said shoe section is offset from said second cell section toward the bow of the vehicle to overlap a portion of a traction cell adjacent thereto.

6. A vehicle defined in claim 1 wherein said drive train includes a plurality of track guide wheel structures secured to said first, rigid top cell sections for engaging said guide track.

7. A vehicle as defined in claim 6 wherein the vehicle includes two parallel guide tracks and for each said guide track, a pair of laterally spaced track guide wheel structures is mounted in each of said first, rigid top cell sections.

8. A vehicle as defined in claim 1 wherein each of said first, rigid top cell sections includes a high load reduced friction surface for engaging the housing under high loads.

9. A vehicle as defined in claim 1 wherein said continuous guide track defines a generally oval path of travel for the drive train, said generally oval path of travel departing from oval at various positions along the track to affect traction cell positioning and alignment.

10. A vehicle as defined in claim 9 including a straight track portion extending downwardly that is positioned at the bow waterline entry location of the traction cells.

11. A vehicle as defined in claim 9 including a curved guide track portion extending upwardly that is positioned at the stern waterline extraction location of the traction cells.

12. A vehicle as defined in claim 7 including drive track sprockets at the forward and aft ends of the vehicle located above the design waterline of the vessel, with the axis of rotation of the sprocket at the bow being higher above the design waterline than the sprocket at the aft end.

13. A vehicle as defined in claim 2 wherein said inflatable air beams extend transversely to a direction of travel of the vehicle when in use.

14. A vehicle as defined in claim 2 wherein said inflatable air beams include air beams of different diameters.

15. A vehicle as defined in claim 2 wherein said air beams extend in said cover in a direction of travel of the vehicle when in use.

16. A vehicle as defined in claim 2 wherein said semi-rigid cell sections each include a first portion thereof including a flexible foam material and a second portion thereof including said inflatable air beams.

17. A vehicle as defined in claim 16 wherein each of said at least one semi-rigid cell section has a surface portion which is raked relative to vertical, to define a thrust surface.

18. A vehicle as defined in claim 17 wherein each of said at least one semi-rigid cell section includes a shoe section located between said second portion containing said inflatable air beams and said bottom surface; said shoe section having a vertical rear surface for providing thrust in water.

19. A vehicle as defined in claim 18 wherein said shoe section contains air beams.

20. A vehicle as defined in claim 18 wherein said shoe section contains a flexible foam material.

21. A vehicle as defined in claim 18 wherein said shoe section is offset from said second portion so that said shoe section extends toward the bow of the vehicle when the bottom of said traction cell faces downwardly in its path of travel to overlap a portion of traction cell adjacent thereto.

22. A vehicle as defined in claim 1 wherein each of said first, rigid top cell sections is hollow and contains an inflatable tube for providing buoyancy and said second, semi-rigid cell sections each include a first portion comprising a plurality of drop stitch inflatable chambers and a second portion between the first portion and said bottom surface containing a closed cell foam.

23. A vehicle as defined in claim 22 wherein said first portion of said second, semi-rigid cell section containing said drop stitch inflatable chambers and said second portion thereof are separately removably mountable from said first, rigid top cell section.

24. A vehicle as defined in claim 2 wherein each of said first, rigid top cell sections includes an extension portion received in a corresponding one of said second, semi-rigid cell sections.

25. A vehicle as defined in claim 24 wherein each of said second, semi-rigid cell sections is formed of a semi-rigid foam.

26. A vehicle as defined in claim 1 wherein each of said first, rigid top cell sections includes an extension which overlies a corresponding one of said second, semi-rigid cell sections in the forward direction of travel when the vehicle is in use.

27. A vehicle as defined in claim 26 wherein the corresponding one of said second, semi-rigid cell sections includes a foam-filled portion between the extension of said first, rigid top cell section and said bottom surface.

28. A vehicle as defined in claim 1 wherein each of said second, semi-rigid cell sections includes a plurality of independent portions, each of which contains a structure which is less rigid than said first, rigid top cell sections.

29. A vehicle as defined in claim 28 wherein the structures in at least two of said independent portions of said second, semi-rigid cell sections are different from each other.

30. A vehicle as defined in claim 29 wherein the structures in said independent portions of said second, semi-rigid cell sections comprise inflatable air beams and foam.

31. A vehicle as defined in claim 3 wherein each of said second, semi-rigid cell sections defines front and rear faces relative to the forward direction of travel of the vehicle when in use, said rear face defining said thrust surface and wherein said front and rear surfaces are raked to be complementary and nest with adjacent cells when traveling in a horizontal path of travel.

32. A vehicle as defined in claim 1 including a sole secured to said bottom surface of each of said traction cells, each sole being of greater penetration resistance than that of said bottom surface.

33. A vehicle as defined in claim 1 wherein each of said second, semi-rigid cell sections has subsections of differing flexibility.

34. A vehicle as defined in claim 2 including means for selectively varying the air pressure in said inflatable air beams to provide said second, semi-rigid cell sections with differing flexibility.

35. A vehicle as defined in claim 1 wherein complementary faces of adjacent traction cells are touching at the minimum separation distance.

36. An amphibious, all-terrain vehicle comprising a housing having a bow, a stern transom and a design waterline comprising a housing and including a continuous guide track, at least one track drive for propulsive movement in the guide track including a plurality of traction cells for moving the vehicle in forward and aft directions of travel relative to its bow and stern, said traction cells each comprising a first, rigid cell section for connection with the track drive train, and a second cell section including at least one semi-rigid cell section which is less rigid than the first, rigid cell section and is connected to said first, rigid cell section, said second cell section having a bottom surface; and said guide track being shaped so that said traction cells are generally separated from each other at the transom and generally closer to each other at the bow to prevent the cells from impacting the water during entry and to minimize entrapped water when operating astern; wherein each of said at least one said semi-rigid cell section includes a plurality of inflatable air beams; and each of said second, semi-rigid cell sections including a first portion including a flexible foam material and a second portion including said inflatable air beams.

37. An amphibious, all-terrain vehicle comprising a housing having a bow, a stern transom and a design waterline comprising a housing and including a continuous guide track, at least one track drive for propulsive movement in the guide track including a plurality of traction cells for moving the vehicle in forward and aft directions of travel relative to its bow and stern, said traction cells each comprising a first, rigid cell section for connection with the track drive train, and a second cell section including at least one semi-rigid cell section which is less rigid than the first, rigid cell section and is connected to said first, rigid cell section, said second cell section having a bottom surface; and said guide track being shaped so that said traction cells are generally separated from each other at the transom and generally closer to each other at the bow to prevent the cells from impacting the water during entry and to minimize entrapped water when operating astern; each of said first, rigid cell sections being hollow and containing an inflatable tube for providing buoyancy and each of said second, semi-rigid cell sections including a first portion comprising a plurality of drop stitch inflatable chambers and a second portion between the first portion and said bottom surface containing a closed cell foam.

\* \* \* \* \*